United States Patent
Lomanto et al.

(10) Patent No.: US 12,056,140 B2
(45) Date of Patent: Aug. 6, 2024

(54) CONNECTED DATA ACROSS DATA FRAMEWORKS

(71) Applicant: Nasdaq, Inc., New York, NY (US)

(72) Inventors: Nicholas Lomanto, Stamford, CT (US); Brian Putz, Los Angeles, CA (US); Srikanth Jonnalagedda, Bangalore (IN); Puneeth Ramakrishna, Bangalore (IN); Dalmer Azevado, Leander, TX (US)

(73) Assignee: NASDAQ, INC., New York, NY (US)

( * ) Notice: Subject to any disclaimer, the term of this patent is extended or adjusted under 35 U.S.C. 154(b) by 179 days.

(21) Appl. No.: 17/721,954

(22) Filed: Apr. 15, 2022

(65) Prior Publication Data

US 2023/0153315 A1    May 18, 2023

(51) Int. Cl.
| | |
|---|---|
| *G06F 16/00* | (2019.01) |
| *G06F 16/2455* | (2019.01) |
| *G06F 16/248* | (2019.01) |
| *G06F 16/28* | (2019.01) |
| *G06F 18/22* | (2023.01) |

(52) U.S. Cl.
CPC ........ *G06F 16/248* (2019.01); *G06F 16/2455* (2019.01); *G06F 16/287* (2019.01); *G06F 18/22* (2023.01)

(58) Field of Classification Search
None
See application file for complete search history.

(56) References Cited

U.S. PATENT DOCUMENTS

| | | | |
|---|---|---|---|
| 2002/0065856 A1* | 5/2002 | Kisiel | G06F 16/93 707/E17.058 |
| 2023/0273919 A1* | 8/2023 | Meling | G06F 16/245 707/769 |

* cited by examiner

*Primary Examiner* — Thu Nguyet T Le
(74) *Attorney, Agent, or Firm* — Nixon & Vanderhye, PC

(57) ABSTRACT

Example implementations of this disclosure relate to establishing and maintaining connections among data items that may be used for various reporting and/or display purposes. Connected data items may be differently named and may be in the same or different data collections. User interfaces are provided so that for a particular response data item, its associated other response data items can be found, viewed and operated upon by administrative users and/or client users efficiently in order to ensure consistency of the response data across multiple target output reports. Example implementations also include techniques implemented in front end systems and/or backend systems for efficiently searching for connectable data items, and to efficiently store and maintain the data items and their connections.

19 Claims, 23 Drawing Sheets

300

Framework 304
| | |
|---|---|
| Framework-Id | Integer |
| Name | Character Var (100) |
| Time-created | Timestamp |
| Time-updated | Timestamp |
| Customer-id | Integer |
| ... | |

Category 306
| | |
|---|---|
| Category-id | Integer |
| Name | Character Var (100) |
| Time-created | Timestamp |
| Time-updated | Timestamp |
| Order | Integer |
| ... | |

Preference 308
| | |
|---|---|
| Preference-Id | Integer |
| ... | |

Layout 310
| | |
|---|---|
| Layout-Id | Integer |
| ... | |

Datapoint 302
| | |
|---|---|
| Datapoint-Id | Integer |
| Name | Character Var (100) |
| Framework-id | Integer |
| Category-id | Integer |
| Response-id | Integer |
| Override | Boolean |
| Layout-id | Integer |
| Preference-id | Integer |
| Position-id | Integer |
| Notes-id | Integer |
| Comments-id | Integer |
| Time-created | Timestamp |
| Time-updated | Timestamp |
| Is-approved | Boolean |
| Is-Denied | Boolean |
| Time-Appr-Den | Timestamp |

Response 312
| | |
|---|---|
| Response-Id | Integer |
| Response-Val | Character Var (250) |
| Time-created | Timestamp |
| Time-updated | Timestamp |
| ... | |

Connection 314
| | |
|---|---|
| Connection-id | Integer |
| Name | Character Var (100) |
| Parent-dp-id | integer |
| Child-dp-id | integer |
| ... | |

Comments 316
| | |
|---|---|
| Comments-Id | Integer |
| description | Character Var (100) |
| Time-created | Timestamp |
| ... | |

Notes 318
| | |
|---|---|
| Notes-Id | Integer |
| Description | Character Var (100) |
| Time-created | Timestamp |
| ... | |

FIG. 3

CONNECTED DATA ACROSS DATA FRAMEWORKS

CROSS REFERENCE(S) TO RELATED APPLICATION(S)

This application claims priority to Provisional Application No. 202111049047 filed in India, on Oct. 29, 2021. The entire content of Indian Provisional Application No. 202111049047 is hereby incorporated by reference.

TECHNICAL OVERVIEW

The technology described herein relates to data. More particularly, the technology described herein relates to creating, maintaining and using associations between data structures in separate data collections.

INTRODUCTION

The increasing proliferation of large and dynamic collections of data and increasingly sophisticated requirements for data-driven decisions and actions require techniques for efficiently maintaining consistency among different data regarding the same or similar subjects across many data collections. By ensuring consistency of data that relate to the same or similar subjects across many data collections relating to an entity, the entity may facilitate more consistent and accurate actions, decisions, reporting etc., based on that underlying data.

For ensuring such consistency, efficient techniques are needed to discovering data relating to the same or similar subject in all relevant data collections. Once data relating to the same or similar subject are discovered in the different data collections, techniques are also needed for efficiently maintaining the relationship between the related data while allowing for changes to the data collections.

Accordingly, it will be appreciated that new and improved techniques, systems, and processes for efficiently ensuring consistency of data across data collections are continually sought after.

SUMMARY OF EXAMPLE EMBODIMENTS

An example system comprises a server system that includes a memory storing report information associated with a plurality of reports, the report information comprising, for each report, a report name, at least one data category, one or more data points for each of the at least one data category, and a result value for each of the one or more data points. The server system also includes a first processing system coupled to the memory and comprising at least one processor.

The example system also includes a client device comprising a display and a second processing system comprising at least one processor. The second processing system configured to: in response to receiving a user input in association with a first data point displayed in a first display area of the display, displaying the first data point and a plurality of other data points in a second display area of the display, wherein each of the other data points is associated, in said memory of the server system, with at least the first data point, and wherein each of the first data point and the other data points are associated, in the memory, with respectively different reports of the plurality of reports; in response to receiving a first result value in a user input provided to an input field associated with the first data point, updating a respective displayed result value associated with each of the other data points to the first result value or another result value in accordance with at least a respective flag associated with said each other data point; and transmitting information associated with the first data point and each said other data point to the server system, wherein the information associated with the first data point includes the first result value and the information associated with each said other data points includes the updated respective result value of said each other data point.

The first processing system of the server system is configured to receive the transmitted information and update the report information in the memory in accordance with the transmitted information.

This Summary is provided to introduce a selection of concepts that are further described below in the Detailed Description. This Summary is intended neither to identify key features or essential features of the claimed subject matter, nor to be used to limit the scope of the claimed subject matter; rather, this Summary is intended to provide an overview of the subject matter described in this document. Accordingly, it will be appreciated that the above-described features are merely examples, and that other features, aspects, and advantages of the subject matter described herein will become apparent from the following Detailed Description, Figures, and Claims.

BRIEF DESCRIPTION OF THE DRAWINGS

These and other features and advantages will be better and more completely understood by referring to the following detailed description of example non-limiting illustrative embodiments in conjunction with the drawings of which:

FIG. 3 shows an example database schema representing the data, including, for example, direct connection data, stored in a database in the system of FIG. 1, in accordance with some embodiments;

DETAILED DESCRIPTION

In the following description, for purposes of explanation and non-limitation, specific details are set forth, such as particular nodes, functional entities, techniques, protocols, etc. in order to provide an understanding of the described technology. It will be apparent to one skilled in the art that other embodiments may be practiced apart from the specific details described below. In other instances, detailed descriptions of well-known methods, devices, techniques, etc. are omitted so as not to obscure the description with unnecessary detail.

Sections are used in this Detailed Description solely in order to orient the reader as to the general subject matter of each section; as will be seen below, the description of many features spans multiple sections, and headings should not be read as affecting the meaning of the description included in any section.

Overview

Example embodiments of this disclosure provide, inter alia, for the discovery, setting up and maintaining of connections between related data items distributed throughout one or more data collections. In this disclosure, data collections may be referred to as "data frameworks" or frameworks, connections established in embodiments between related data items may be referred to as "direct connections" and data items that can be associated by the direct connections may be referred to as "data points."

Figure 1:
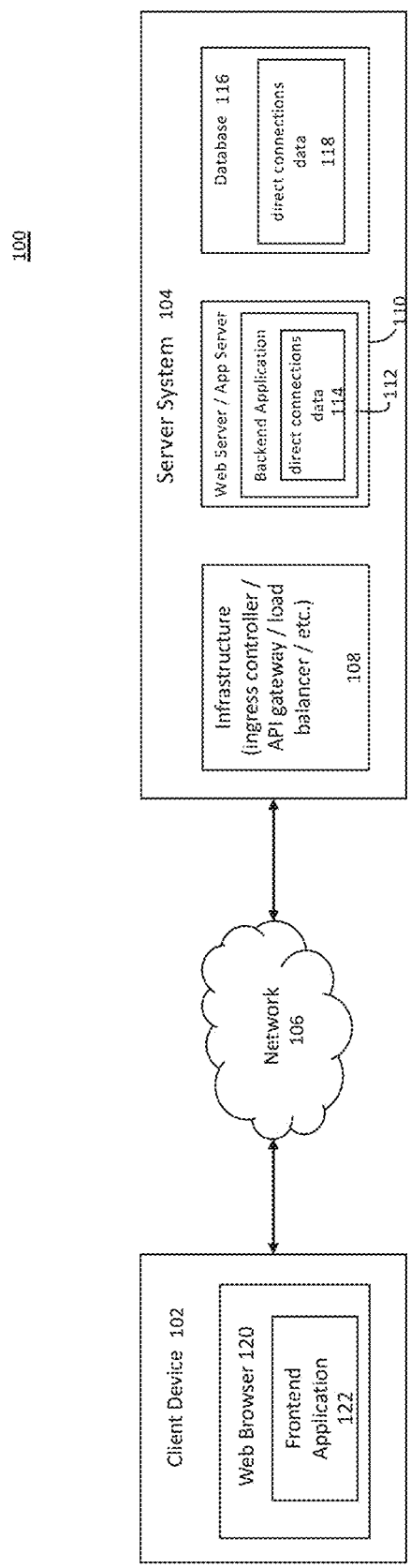
FIG. 1 shows the overall system architecture of an example system including direct connection data and an application utilizing the direct connection data, according to some embodiments.
Figure 2:
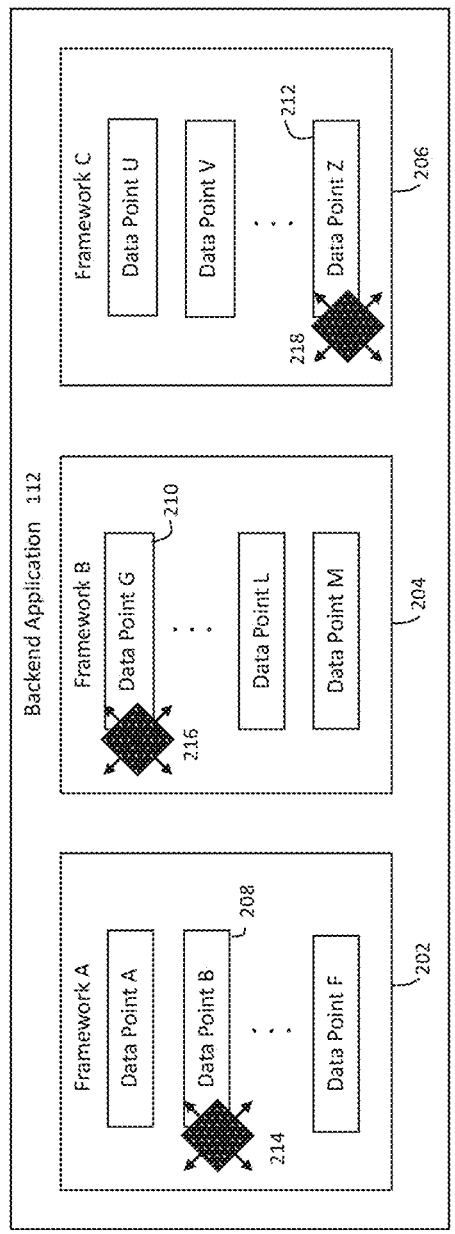
FIG. 2 shows a conceptual view of the data organization in a backend application in the system of FIG. 1, according to some embodiments.

FIG. 1 shows the overall system architecture of an example system including direct connection data and an example web application utilizing the direct connection data, according to some embodiments. The web application includes a backend application which executes in a server system, and a frontend application that executes on a client device. FIG. 2 shows a conceptual view of the data organization in a backend application in the example system of FIG. 1. FIG. 3 shows an example database schema representing the data, including, for example, direct connection data, stored in a database in the example system of FIG. 1.

Figure 4A:
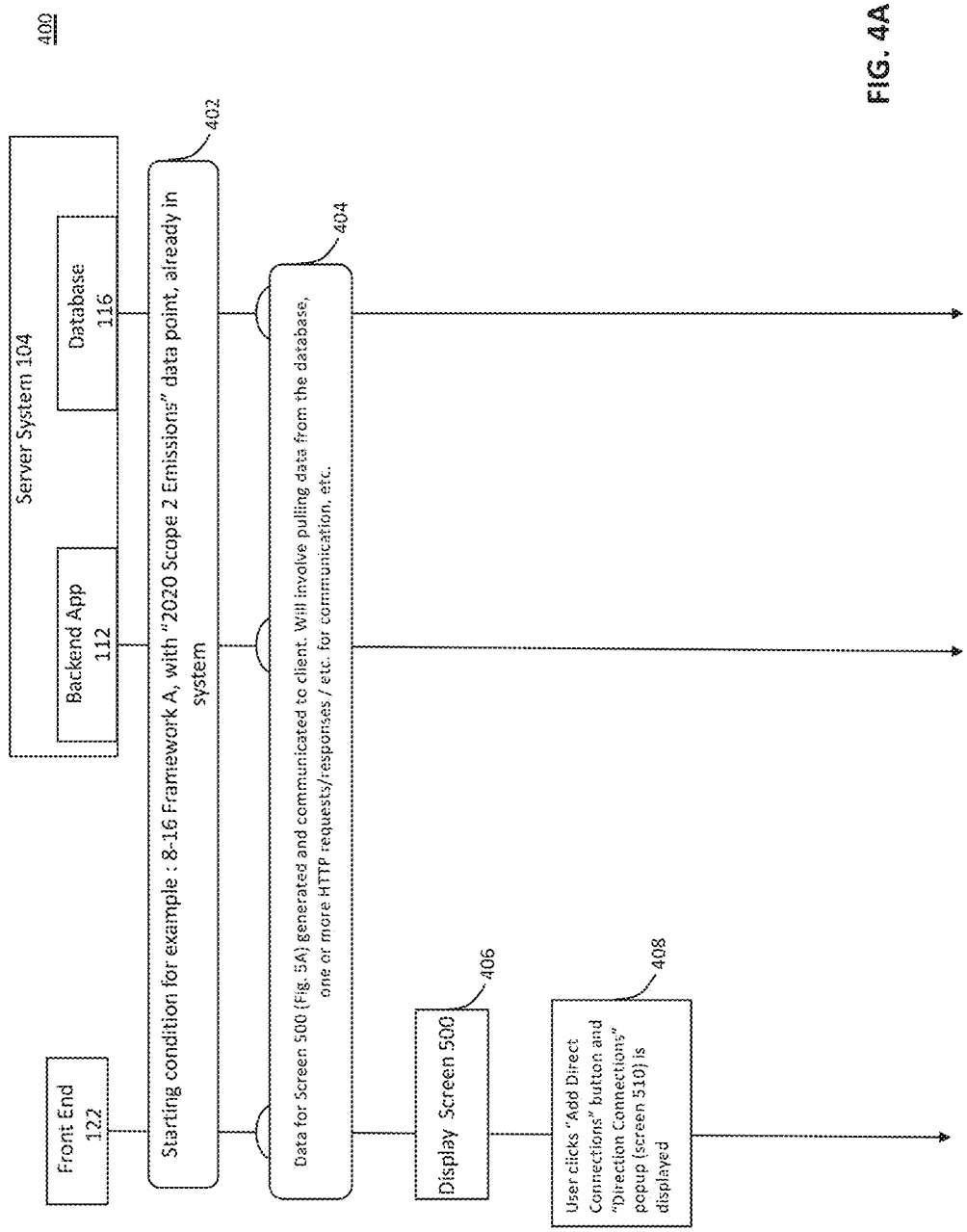
FIGS. 4A and 4B show a flowchart of a process for adding a direct connection, according to some embodiments.
Figure 4B:
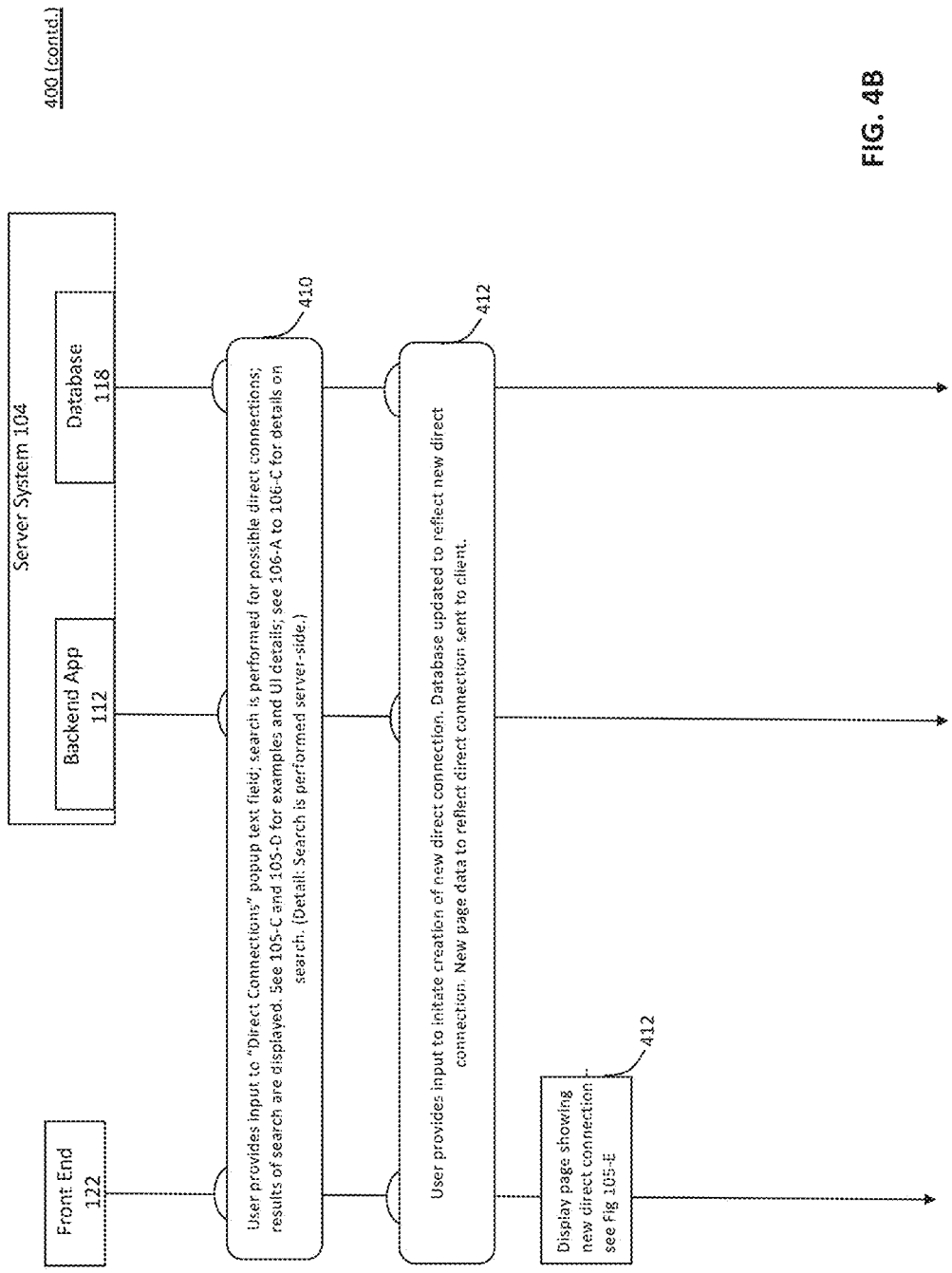
Figure 5A:
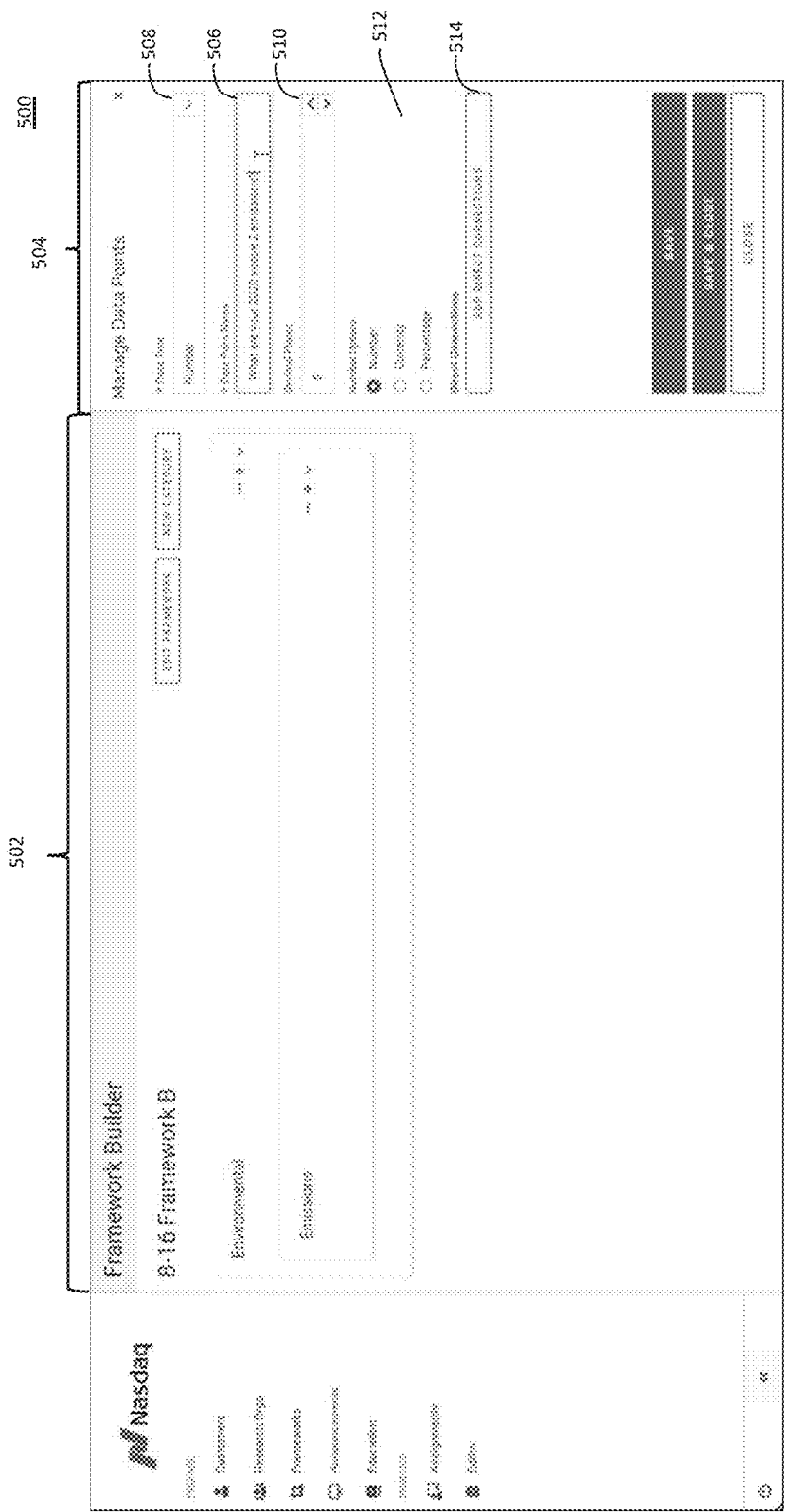
FIG. 5A-5E show example screens of a user interface presented during process 400, according to some embodiments.
Figure 6:
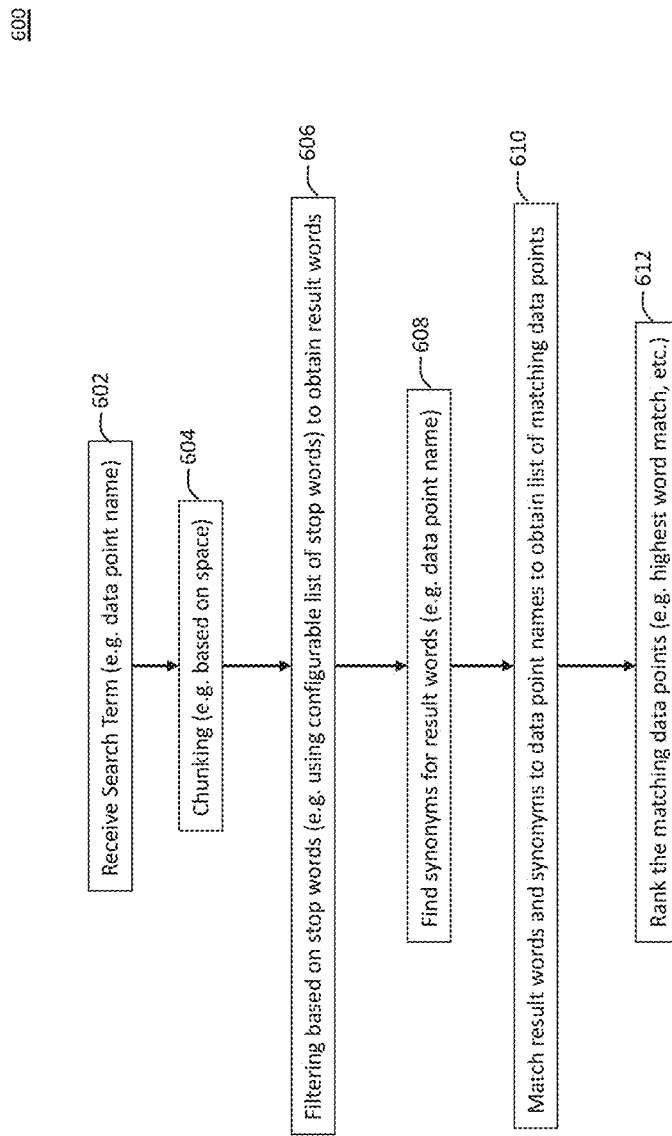
FIG. 6 shows a search process that may be invoked during a process for adding a direct connection such as that shown in FIGS. 4A and 4B, according to some embodiments.
Figure 7A:
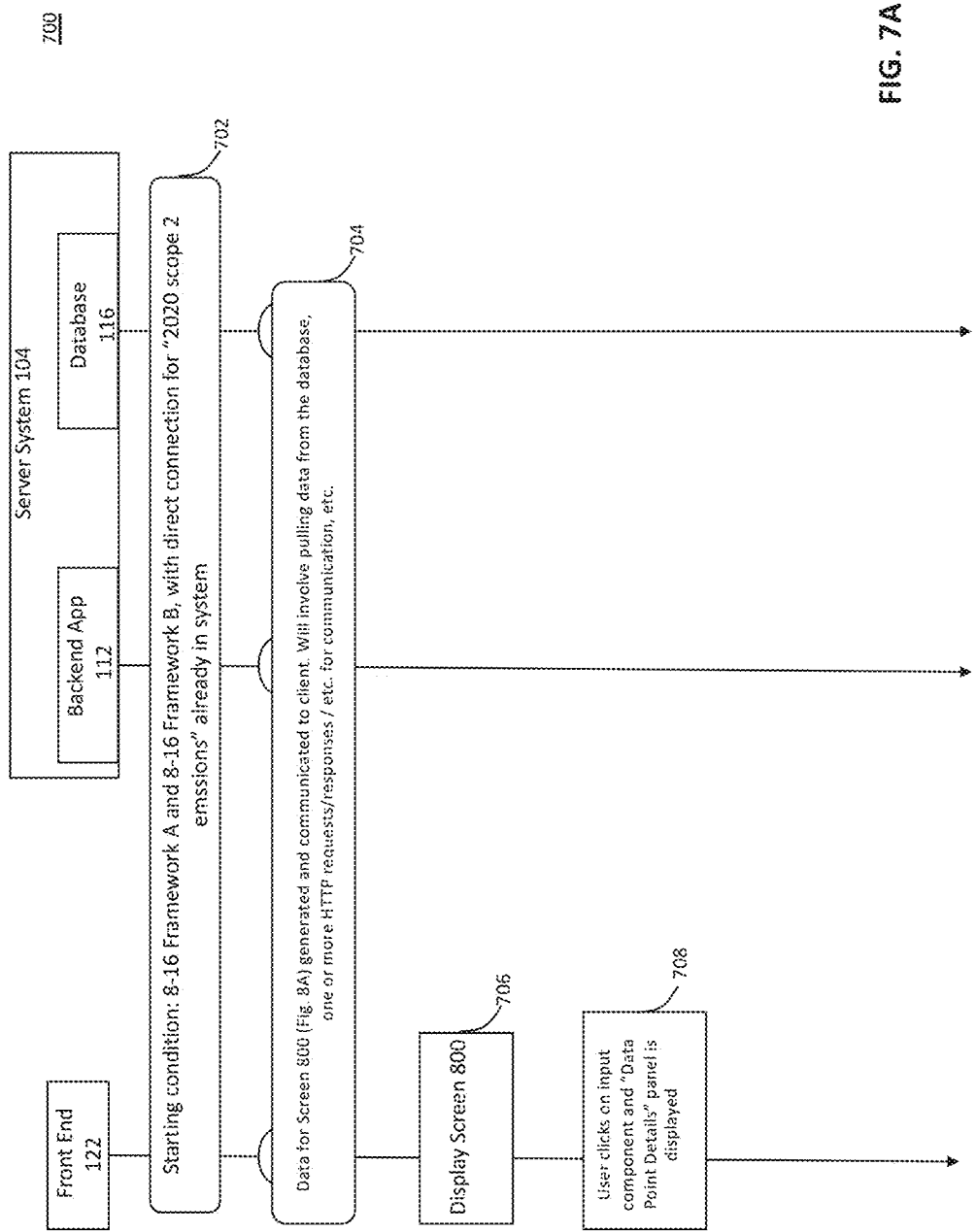
FIGS. 7A, 7B and 7C show a process for a user to update direct connection information, according to some embodiments.
Figure 7B:
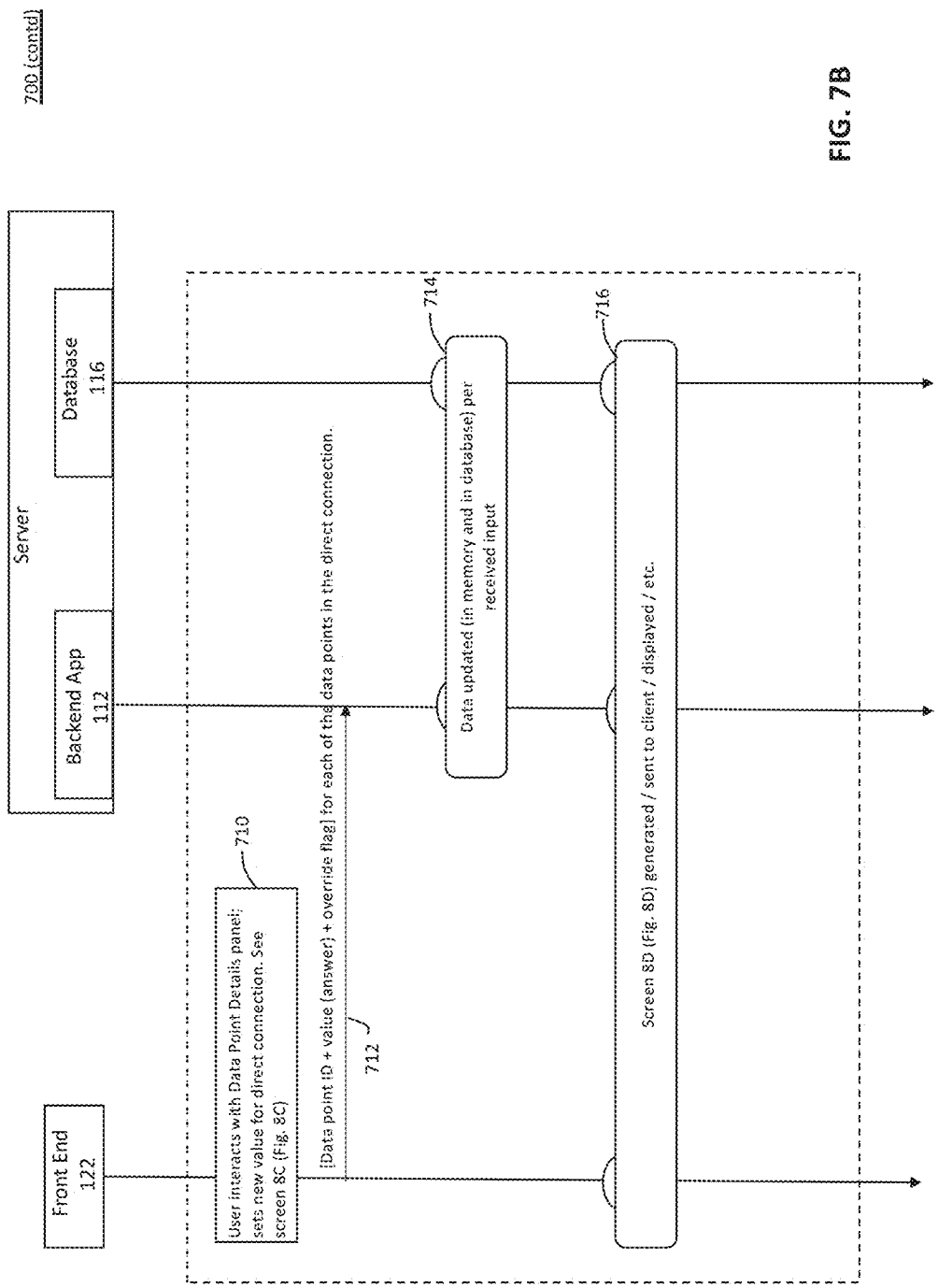
Figure 7C:
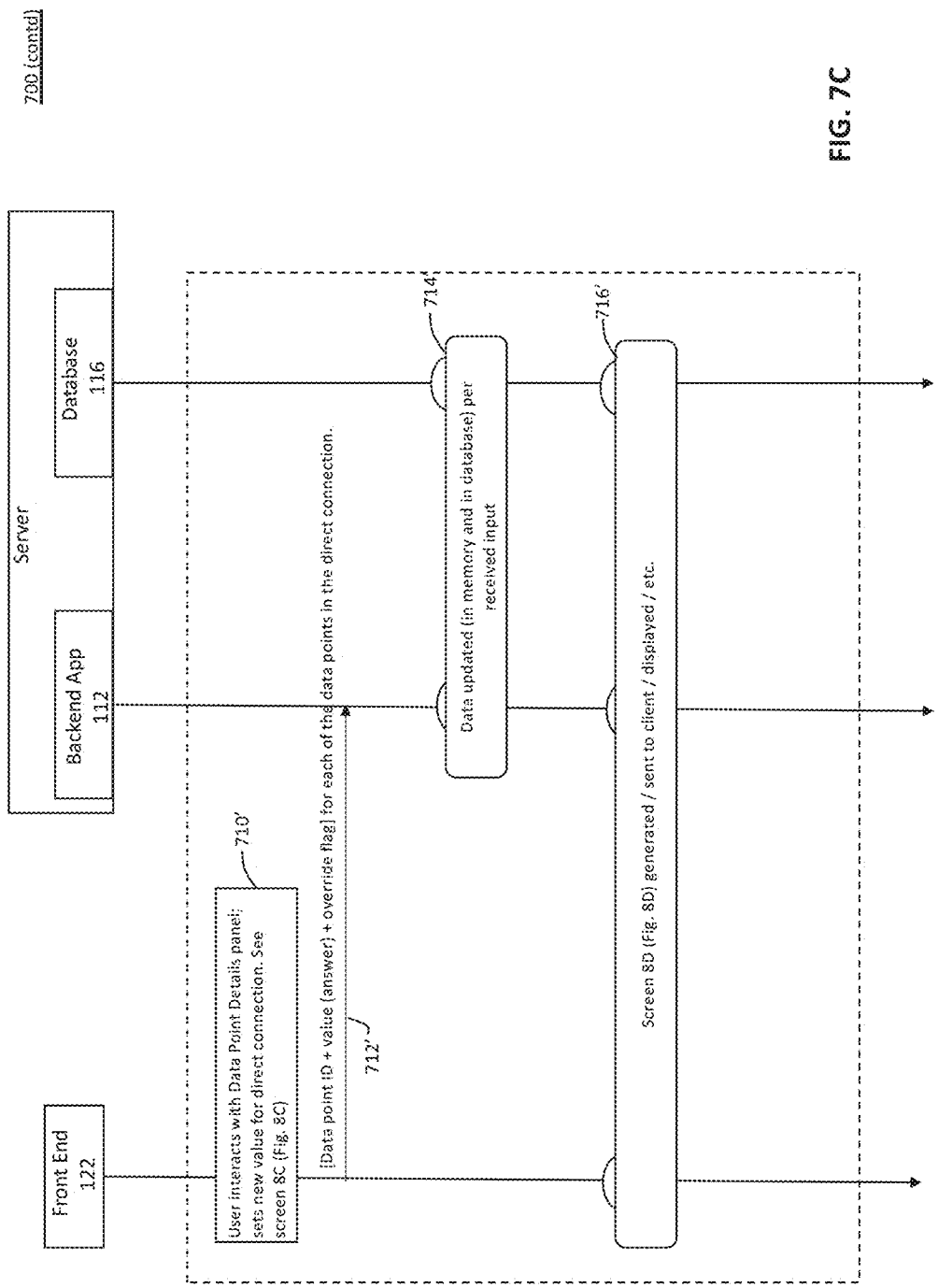
Figure 8A:
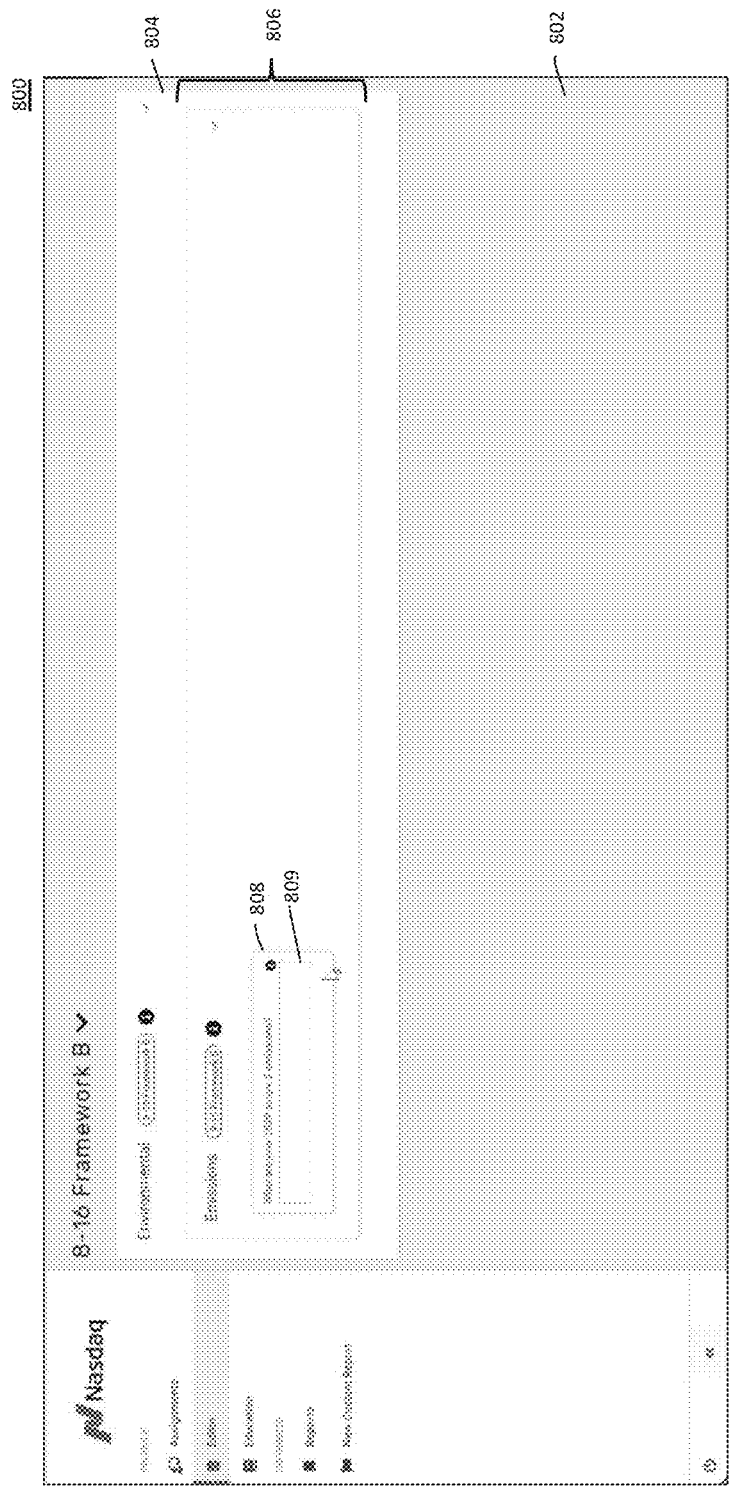
FIGS. 8A-8F show example screens of a user interface presented during the process of FIGS. 7A-7C, according to some embodiments.
Figure 8B:
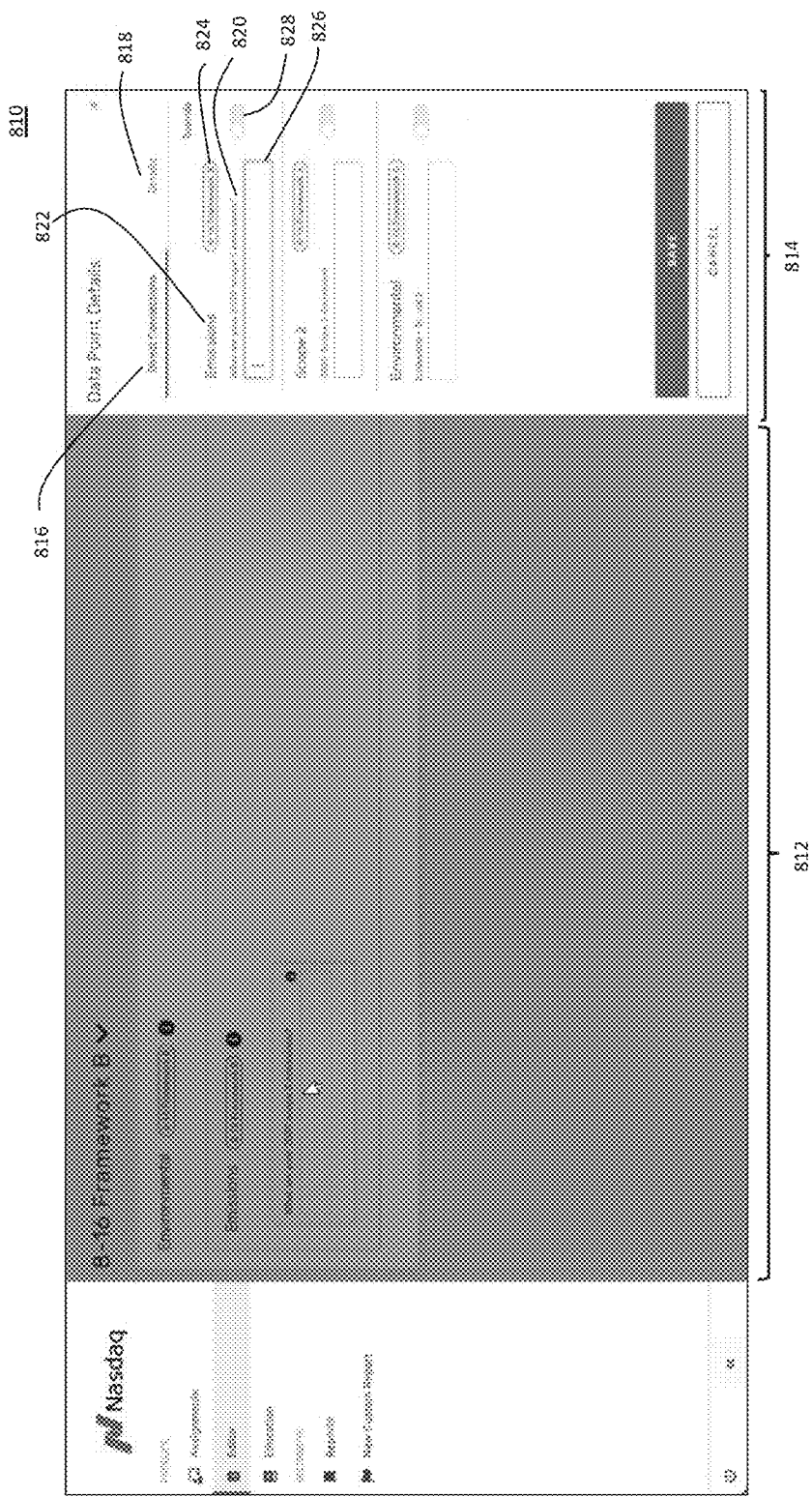
Figure 8C:
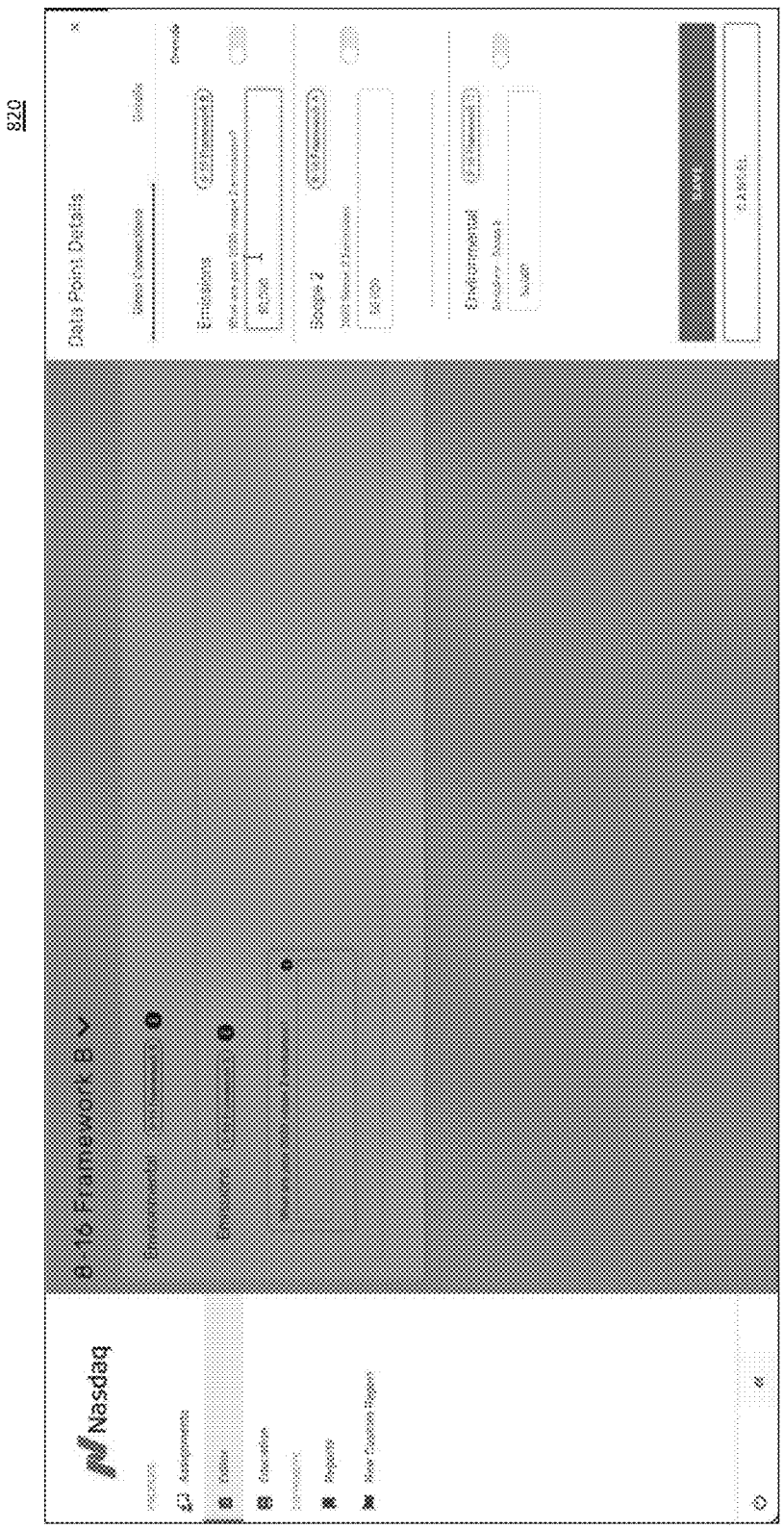
Figure 8D:
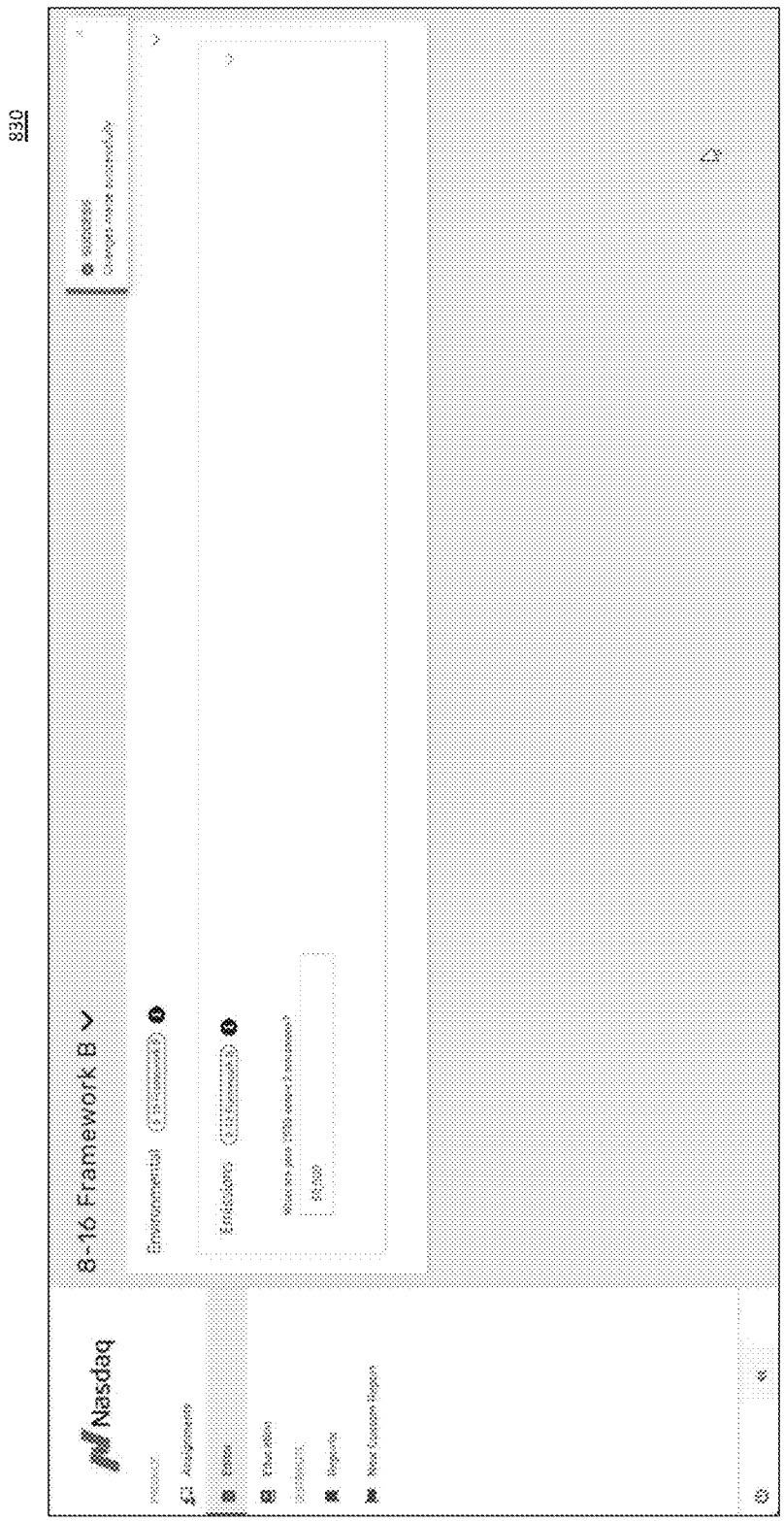
Figure 8E:
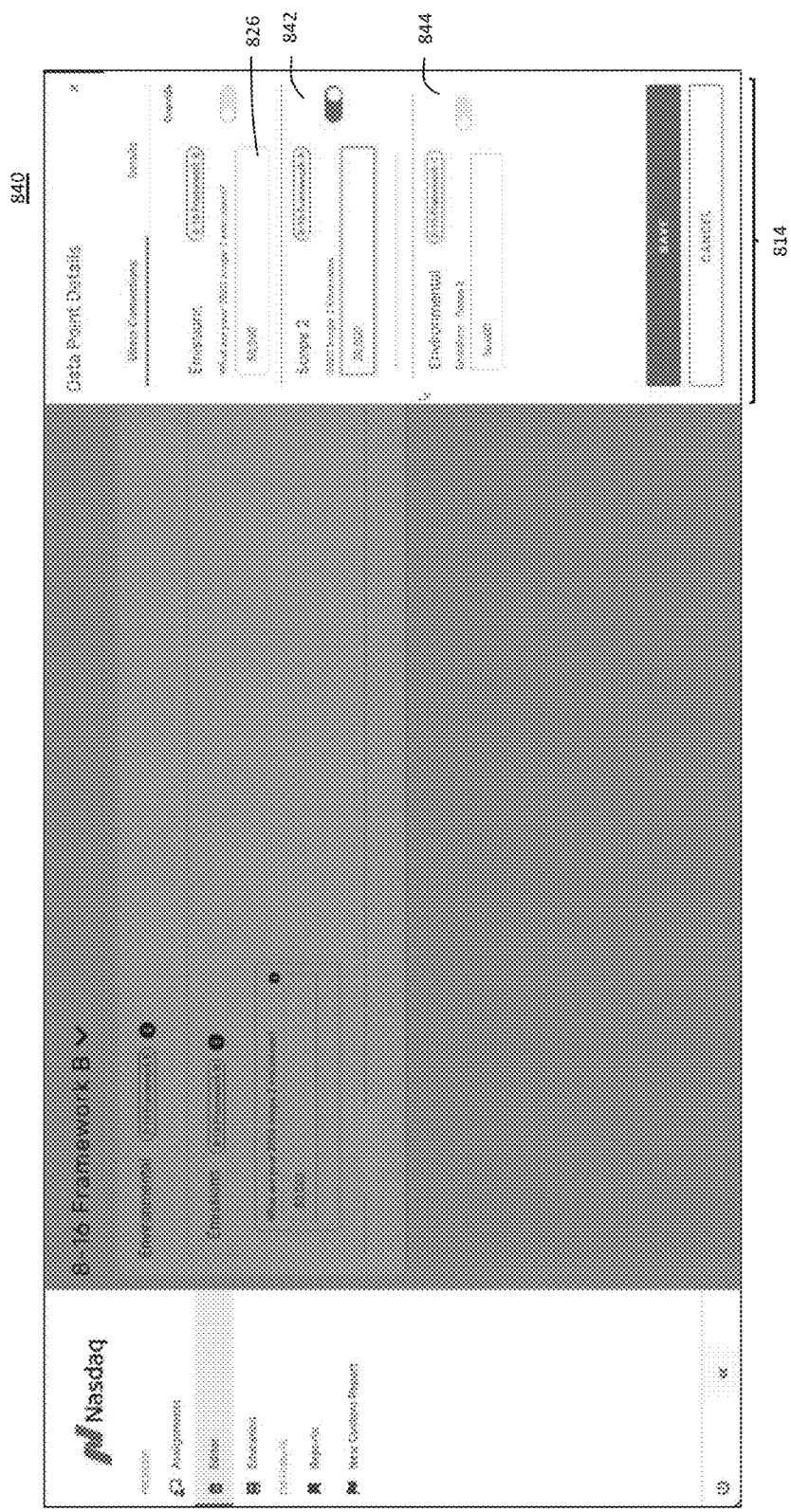
Figure 8F:
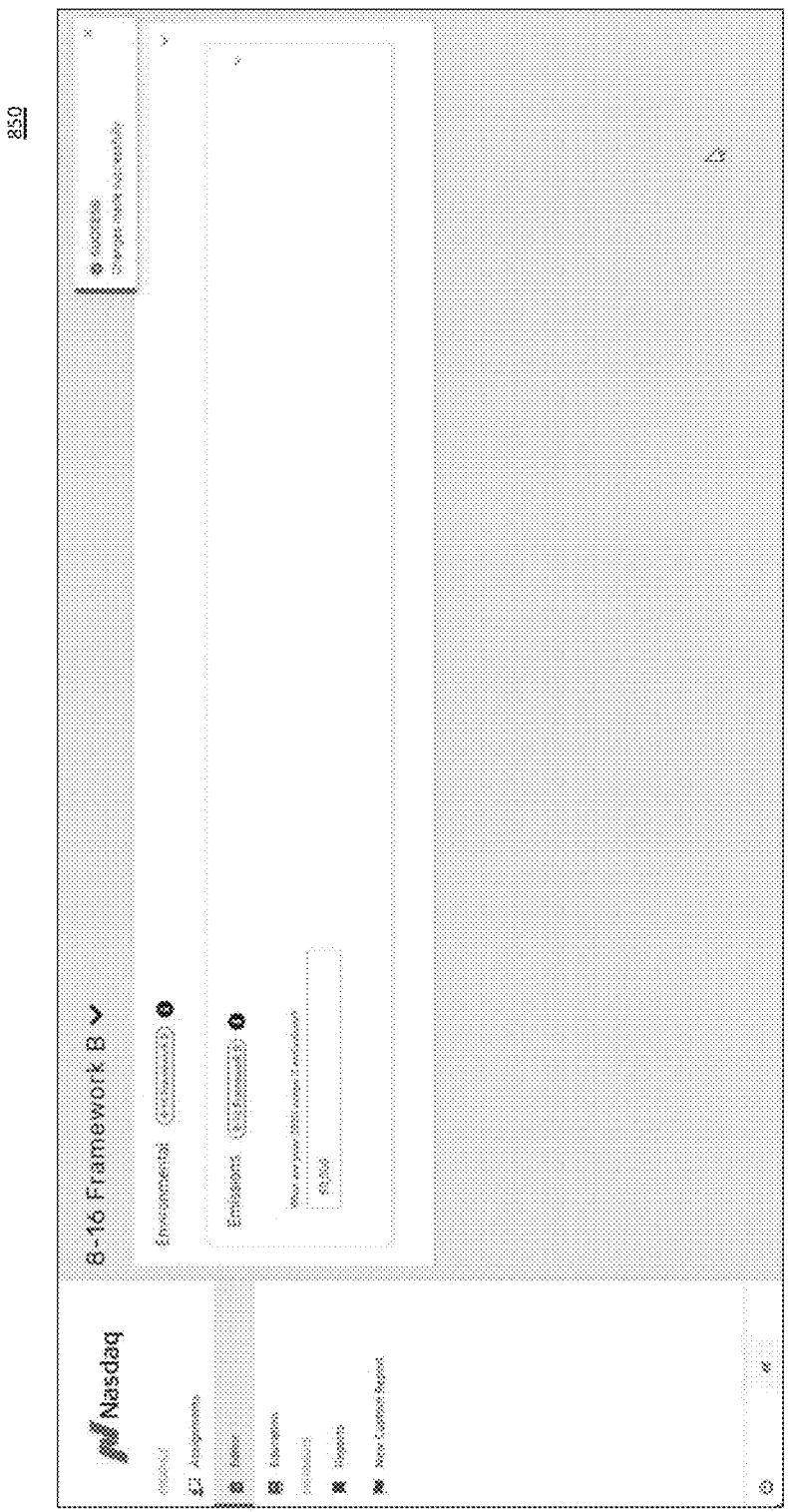
Figure 9A:
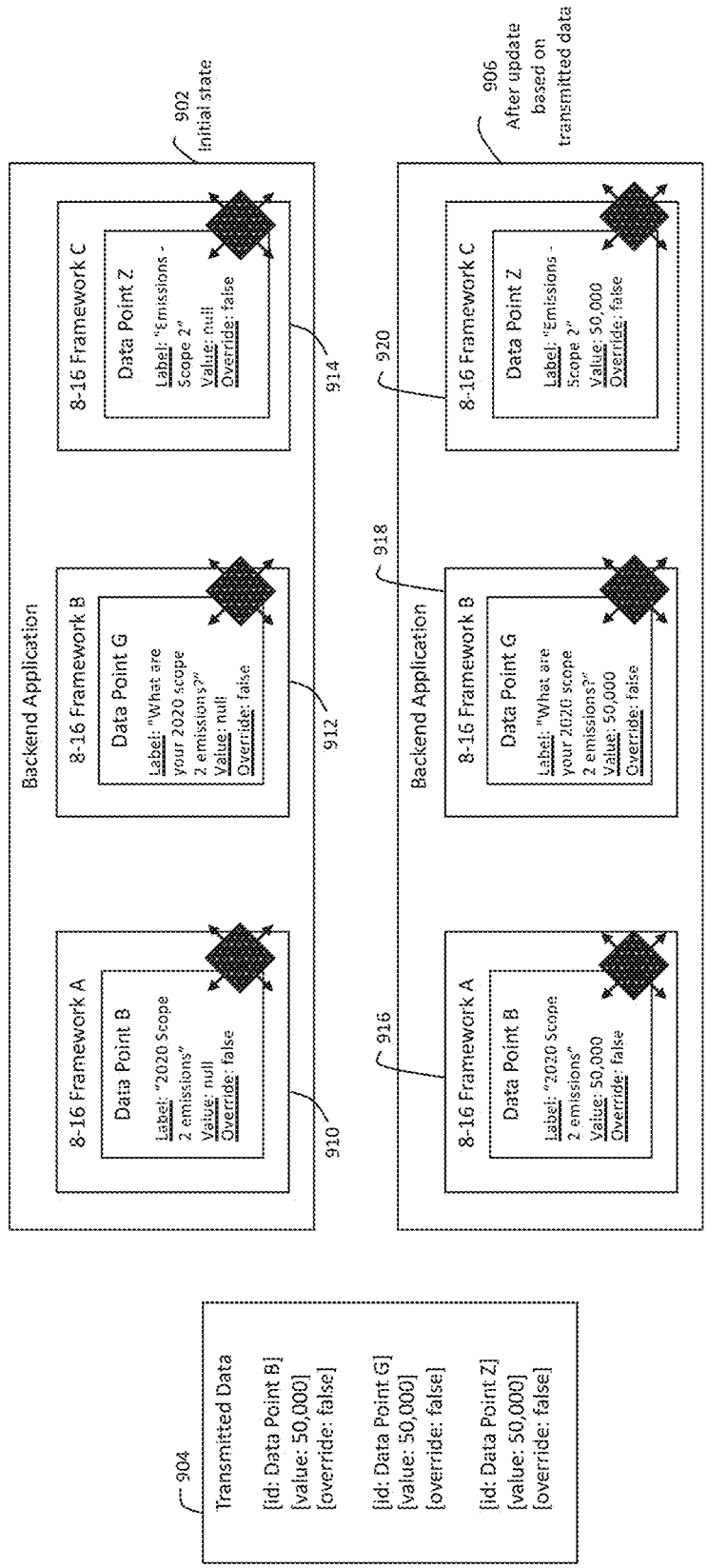
FIGS. 9A and 9B show data structures representing data points that are made available for editing in the scenarios shown in FIG. 8B and FIG. 8E, respectively, according to some embodiments.
Figure 9B:
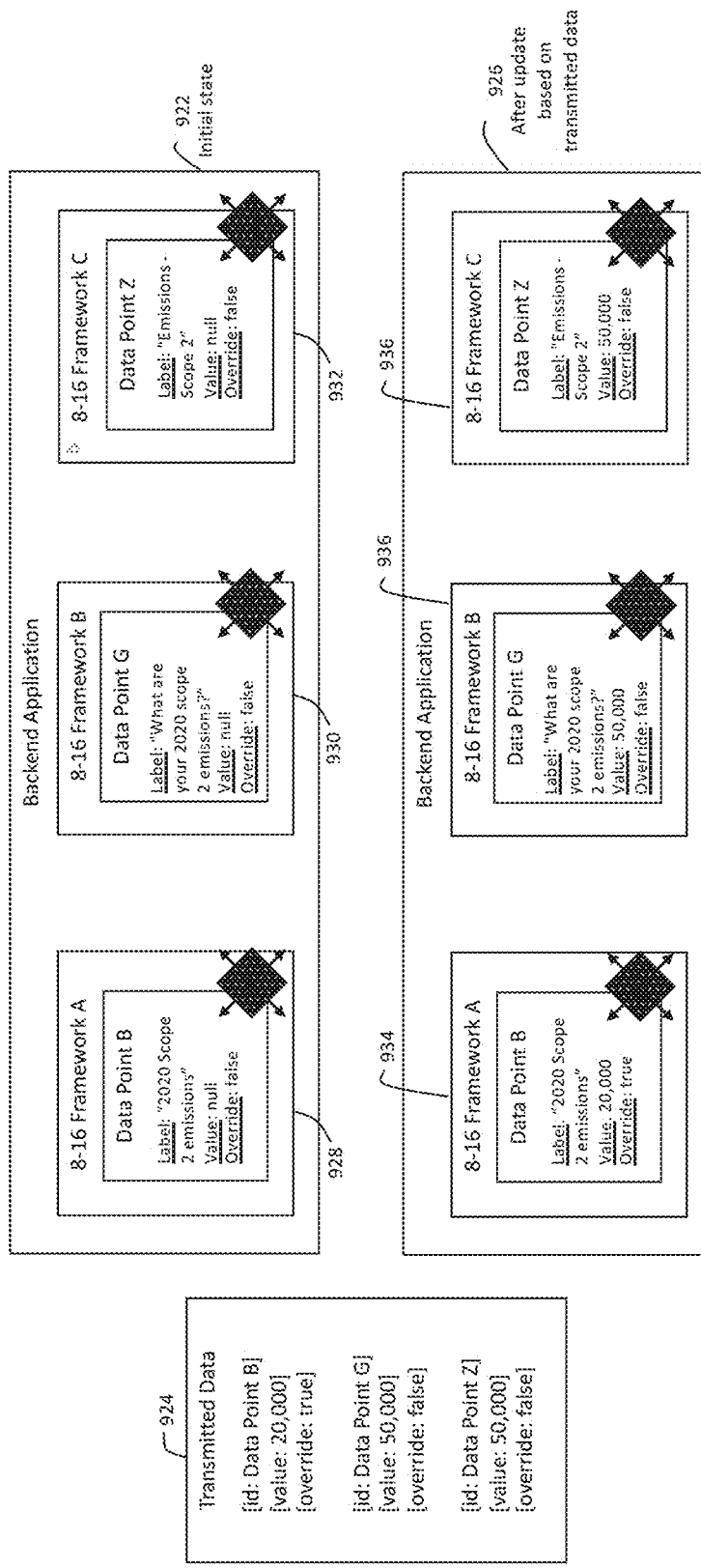
Figure 10:
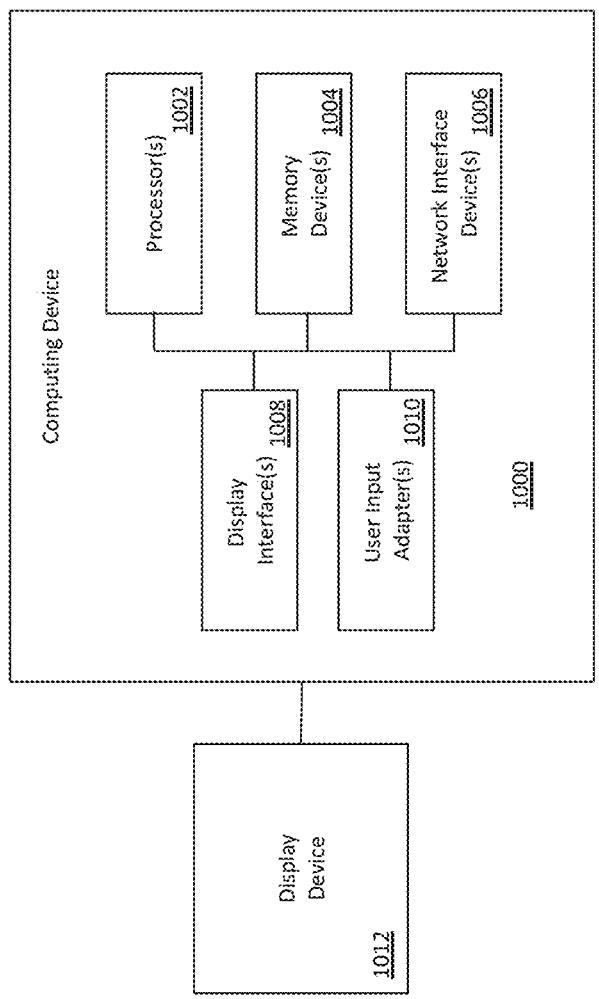
FIG. 10 shows an example computing device that may be used in some embodiments to implement features described herein.

FIGS. 4A and 4B show a flowchart of a process for adding a direct connection to a chosen data point, according to some embodiments; in some embodiments, this process would involve the web application receiving user input from an administrative user of the web application. FIG. 5A-5E show example screens of a user interface presented during a process for adding a direct connection to a chosen data point. FIG. 6 shows an example search process that may be invoked during a process for adding a direct connection to the chosen data point such as that shown in FIGS. 4A and 4B, in order to find data points that may be eligible to be direct connected to the chosen data point. FIGS. 7A, 7B and 7C show a process for a user to update direct connection information associated with a chosen data point, according to some embodiments; in some embodiments, this process would involve the web application receiving user input from a client user (i.e., customer user) of the web application. FIGS. 8A-8F show example screens of a user interface presented during the process of FIGS. 7A-7C, to update direct connection information associated with a chosen data point. FIGS. 9A and 9B show data structures representing data points that are made available for editing in the scenarios shown in FIG. 8B and FIG. 8E, respectively, according to some embodiments. FIG. 10 shows an example computing device that may be used in some embodiments to implement features described herein.

As already noted, example embodiments of this disclosure relate to techniques for establishing and maintaining connections among data items that may be used for various reporting and/or display purposes. User interfaces are provided so that for a particular response data item, its associated other response data items can be found, viewed and operated upon by administrative users and/or client users efficiently in order to ensure consistency of the response data across multiple target reports. Example embodiments also include techniques implemented in the front end systems and/or the backend systems for efficiently searching for associated data items, and to efficiently store and maintain the data items and their interconnections.

An entity such as, for example, a corporation, can be described in terms of and/or in relation to different aspects and/or characteristics of the entity, such as its corporate structure, management, number and make up of employees, investors and shareholders, finances, goals, targets, commitments, investments, carbon footprint and other environmental impacts, diversity, etc. Entities may often be required to generate reports based on such information.

As an entity gets larger, the volume and complexity of such information grows. Additionally, such reports may require to be generated for an increasing number of different targets or purposes. With increasing volume and complexity, and with multiple targets for which the information is required to be presented, ensuring the accuracy of such reporting may become an issue. Moreover, as the number of targets for such reporting grows over time, consistency of the information reported to multiple targets over time must be ensured.

Environmental, Social and Governance (ESG) reporting is an example of the reporting referred to above. Corporations and other entities periodically (e.g. annually) report on various ESG achievements and targets in response to an array of questionnaires. Each of these questionnaires may have a substantial overlap with others of the questionnaires in terms of the information required. However, aspects such as, for example, the questions posed in the respective questionnaires or reports being often different in syntax from questions in the other questionnaires, makes the task of efficiently ensuring accuracy and consistency of the responses across the array of questionnaires or reports becomes challenging. In some embodiments, the web application described in relation to FIGS. 1-10 may be used for ESG reporting and for maintaining ESG data.

Such issues of ensuring accuracy and consistency of response data across multiple targets are not limited to ESG reporting and corporations. Such issues may also be encountered with respect to information regarding other types of organizations, computer systems, product lines (e.g., food, automotive, etc.), and the like. In some example embodiments, the web application described in relation to FIGS. 1-10 may be used in association with information regarding such other types of organizations, computer systems, and product lines.

In many places in this document, software (e.g., modules, software engines, processing instances, services, applications and the like) and actions (e.g., functionality) performed by software are described. This is done for ease of description; it should be understood that, whenever it is described in this document that software performs any action, the action is in actuality performed by underlying hardware elements (such as a processor and a memory device) according to the instructions that comprise the software. Such functionality may, in some embodiments, be provided in the form of firmware and/or hardware implementations. Further details regarding this are provided below in, among other places, the description of FIG. 10.

Description of FIG. 1

FIG. 1 shows the overall system architecture of an example system 100 including the direct connection data and an application utilizing the direct connection data, according to some embodiments. The example system 100 enables users to establish associations between data elements in disparate frameworks or reports and generate various reporting efficiently and with improved accuracy using the established associations between data elements. An association established between two data elements is referred to as a "connection" or "direct connection."

One or more client devices 102 using web browsers or the like access one or more services provided by a server system 104. The one or more client devices 102 are connected over one or more networks 106 to the server system 104. Although one client device 102 is shown, it will be understood that any number of client devices 102 can be serviced by the server system 104 at any given time.

Server system 104 may include one or more interconnected servers serving an organization. The one or more servers may service user requests received from client systems, such as client device 102. The one or more servers may host a web application in a web server and/or app server 110. In this description, the term web server is used to refer to either one of, or the combination of, a web server which handles HTTP requests and an application server which serves business/application logic to the web application. The web application may, for example, be a reporting data maintenance and report generation application, and may provide a graphical user interface for reporting data maintenance and report generation. For example, each of a plurality of data collections or data frameworks stored in the server system may pertain to a respectively different report.

The web application may include a backend application 112 being executed by the web server and/or app server 110 on the server system 104, and may also have a frontend application 122 executing on a client device 102. Client-side components of an application may operate to provide for handling the user interface by performing presenting (e.g., displaying) of information on a user interface device; receiving user input, etc. Server-side components may provide for authentication, service metering, generating or obtaining information to be presented to the user in accordance with received user inputs. The client-side portion 122 of the web application may, for example, execute within a browser 120 in the client device 102. In some embodiments, however, a client application that is not within a browser may access the web application on the server system 104. The client-side portion (frontend) 122 of the web application may be accessed by users with or without administrative privileges in the web application. For example, in some embodiments, the client-side portion 122 may be invoked on a client device 102 by an administrative user to perform operations such as those described below in relation to process 400, and in some embodiments, the client-side portion 122 may be invoked on a client device 102 by a client or customer user who may have not administrative privileges to perform operations such as those described below in relation to process 700.

The database 116 includes one or more databases, and may store and provide access to report information including report frameworks (e.g., different standard or other reports, etc.), report contents (e.g., report chapters/sections (corresponding to framework categories and subcategories described herein), data points (e.g., questions posed) and response values associated with respective data points, etc.) and the like. In the illustrated environment, the data in the one or more databases 116 may be accessed by the backend application 112 of the web application. The database 116 and/or the backend application 112 of the web application may include a data extraction service module to extract data from the database 116. The data extract module may be implemented as a microservice that interfaces between the backend application and the data in the database 116 in order to provide the web application with access to the data. The database 116 may store direct connection data 118 corresponding to response data items presented to the admin and/or client users who use the client devices 102. The backend application 112 may load direct connection data 114 for processing and/or providing to the frontend application 122, before they are stored in the database 116. Direct connection data, as described below, include connections between data points in respective data frameworks. The connections between the data points may be in the form of associations stored in a memory.

Server system 104 may include infrastructure 108, which may include ingress controllers, application programming interface (API) gateways, load balancers, interconnection infrastructure connecting servers and connecting to other networks such as network 106 which may include one or more local and/or wide area networks, etc. An API gateway may serve as the entry point for client devices to use one or more access application programming interfaces (APIs) provided with the web application. For example, any request from either client device to access one or more APIs defined in the server system 104 to access databases in database 116 via the web application (more specifically, backend application of the web application) will first be received by the API gateway. The API gateway may additionally perform, or coordinate, functions such as authentication of users and user requests, enforcing access and security constraints, and the like for user requests. One or more servers in server system 104 may be configured for other backend services such as, for example, authentication, user configurations, security, credentials etc. The backend services may also provide for user and/or application session maintenance and the like.

Server system 104 may include one or more physical server computers that are communicatively connected to each other over a network and/or point-to-point connections. The physical server computers may be geographically co-located or distributed. The interconnection between servers in server system 104 may be via the Internet or over some other network such as a local area network, a wide area network or point-to-point connections (not separately shown) with each other. In some embodiments, multiple servers are interconnected with high speed point-to-point connections and/or a high speed broadcast bus. Each physical server in the server system 104 includes a processing system having at least one uni- or multi-core processor and includes system software. In some embodiments, each physical server may correspond to a processing unit in a Symmetric Multiprocessor (SMP). In some embodiments, each physical server may be standalone computer interconnected to one or more other computers with a high speed connection. In some embodiments, a server corresponds to a server process running on one or more physical computers.

Client devices 102 may include any of personal computers, mobile computers, tablets, smartphones, and other electronic devices. In some example embodiments, any electronic computing device including at least a display, an input device for user input, and a communication interface for communicating with the server system may operate as a client device. In some embodiments, some client devices (e.g., client device 102) may have capabilities to, in addition to or alternative to access via API gateways, access the web application without going through the API gateways, whereas some client devices may be restricted to accessing the web application and/or the one or more databases only via the API gateways.

It should be understood that the software modules shown in FIG. 1 and other figures are stored in and executed by hardware components (such as processors and memories), and it should be further understood that, whenever it is described in this document that a software module performs any action, that is done solely for ease of description, and the action is in actuality performed by the underlying hardware elements (such as a processor and a memory device) according to the instructions and data that comprise the software module. Further details regarding example hardware components that may be used to implement the features described herein are provided below with reference to FIG. 10, as well as elsewhere in this document.

Description of FIG. 2

FIG. 2 shows a conceptual view of the data organization in backend application 112 shown in FIG. 1. The data organization in the backend application 112, in this example, concerns three different frameworks: framework A 202, framework B 204 and framework C 206. Each framework includes a plurality of data points: framework A includes data points A-F, framework B includes data points G-M, and framework C includes data points U-Z. A "framework" as used in this disclosure may be considered a report template. Each report may include a plurality of "data points" which may be considered as questions posed or statements. Each data point which is a question posed in a report may have an associated response that is to be included in the report. The term "response value" is used in this disclosure to refer to the response associated with a data point.

In the example shown, each of data point B 208 of framework A, data point G 210 of framework B and data point Z 212 of framework C has direct connections established to each of the others. Direct connection 214 represents direct connections from data point B to data points G and Z, direct connection 216 represents direct connections from data point G to data points B and Z, and direct connection 218 represents direct connections from data point Z to data points B and G. A "direct connection" is an association or connection made between two data points which may each be from a separate framework and/or report. In some example embodiments, a direct connection is a one-to-one bidirectional association between a first data point and a second data point.

A direct connection between a first data point and a second data point may be established by including, in a record or object representing the first data point, a link pointing to or an index or id number identifying the second data point, and including, in the record or object representing the second data point, a link pointing to or an index or id number identifying the first data point. In some embodiments a group of direct connected data points can be represented as a linked list data structure or circular linked list data structure to facilitate efficient traversal. In some embodiments, a circular linked list is implemented by having each link bidirectional, and in some embodiments, by having the last data point in the group link to the first data point in the group. In another embodiment the group may be represented as a fully connected mesh data structure where each data point object is linked directly to each of the other data points. In another embodiment, a table of connections includes a row for each connection between data points. For example, for the example direct connections shown in FIG. 2 for the group of direct connected data points B, G and Z, the connections table will include rows, each row representing a parent-child relationship, for B to G, G to Z, B to Z, G to B, Z to G, and Z to B.

Although FIG. 2 shows three frameworks each with a few data points, embodiments are not limited thereto and may have any number of frameworks each with any number of data points. In some applications, two dozen or more frameworks each with several hundred data points are provided for.

Description of FIG. 3

FIG. 3 shows an example database schema 300 representing the data, including, for example, direct connection data 118, stored in database 116 shown in FIG. 1, in accordance with some embodiments.

Each data point can be represented by a data point object 302. The data point object includes a data point identifier and a name that represents the data point. The data point identifier uniquely identifies the data point. The data point name is a text string that may be in the form of a question, such as, for example, "what is your 2020 scope 2 emissions?". It may also be in the form of a statement that elicits a response, e.g., "state your 2020 scope 2 emissions".

The data point object 302 may also include a framework identifier, a category identifier, a response identifier, and an override flag as attributes. For a particular data point, the framework identifier is used to associate a framework object 304 with the data point, and the category identifier is used to associate a category object 306 with the data point. The response identifier associates a response value object 312 with the data point. The override flag is used to indicate whether the data point is configured as an override, that is, whether or not the response value of this data point is to be propagated to other data points in the group of direct connected data points including this data point. When the flag is false, the response value of this data point will be propagated to other data points in the group of direct connected data points, and when it is true such propagation is prevented. Also, when the flag is true, the response value of this data point will not be changed in accordance with a propagated value from any other data point in the group of direct connected data points.

The data point object 302 may optionally also include a layout identifier identifying a layout object 308, a preference identifier identifying a preference object 310, a position identifier specifying a position of the data point within the category or subcategory, a notes identifier identifying a note object 318 associated with the data point, a comments identifier identifying a comment object 316 associated with the data point, created time of this data point, last updated time, flag indicating whether data point is approved, flag indicating whether the data point is denied, time of approval or denial, and other fields. The position attribute may be used in determining the arrangement of the data point when the user interface is being rendered for the associated framework.

A framework object 304 is uniquely identified by a framework identifier. The framework name attribute describes the framework, such as, for example, "8-16 Framework A". The object may also have attributes identifying the created time, last updated time, customer or customers that use the framework, etc.

A category object 306 is uniquely identified by a category identifier. A category name attribute describes the category. The object may also include attributes specifying the ordering (e.g., ordering of the category within the framework), created and last updated times, etc.

A preference object 308 may be used to specify one or more preferences associated with a data point. For example, a preference object may specify such things as that the data point should allow only a maximum of 100 characters in the response value, that the response value should include only one of a predefined set of options/terms, etc.

A layout object 310 may be used to specify aspects of how the data point and/or the associated response value should be rendered in the user interface. For example, the layout object may specify that the response value is to be selected from a pulldown menu, etc. In another example, the layout object 310 may specify that the data point object 302 that associates the layout object is a row in a table that is identified by a table identifier attribute in the data point object 302 or the corresponding layout object 310. The layout object may specify that the data point occupies a particular row and/or column in the table. Where several layout aspects are to be specified for a particular data point, the layout object 310 may form a linked list of layout objects with a respective layout object specifying a respective one of the aspects.

A response object 312 may be uniquely associated by the response identifier with a data point 302 and includes the response value for the particular question or statement posed in the data point. The object may include attributes specifying created time, update time, etc.

A connection object 314 represents one or more connections where each connection, referred to in this disclosure as a direct connection, is between two data points. A connection object 314 may be associated with a corresponding data point by a connection identifier attribute. In some embodiments, each connection object represents one connection and may include a parent data point identifier and a child data point identifier as attributes. In some embodiments, a connection object includes a parent data point identifier and a plurality of child data point identifiers as attributes or attribute values (e.g., array of child data point identifiers). In some embodiments, a parent data point may not be specified in the connections object and may be determined based on the data point identifier of the data point object 302 that is associated with the connection object. The connection object 302 may include a unique connection identifier attribute. Whereas, in some embodiments, the first direct connection associated with a data point can be found based on the value of the connection id attribute in the data point object 302, the other direct connections in the group of direct connected data points may be found by following the parent-child links in each connection object 314 or, when available, an array of child data point identifiers for the data points that are directly connected to the data point object.

A comments object 316 is associated with a data point object 302 by a comments identifier attribute. A description attribute may contain any comment that that user providing the response value in response to the question posed by the data point would want to store in association with the response value. The object may also include other attributes such as the created time, etc.

A notes object 318 is associated with a data point object 302 by a note identifier attribute. A description attribute of the notes object enables a user to attach a note in association with a data point. The object may also include other attributes such as the created time, etc.

The create time and update time attributes of various objects enable the data points and associated information to be maintained in a manner that is timely, and enables the system to automatically and dynamically include or exclude certain data points and/or associated information in frameworks and/or reports based on time criteria. Attributes pertaining to approval and/or denial (e.g. see the data point object 302) similarly facilitates automatically including objects in frameworks and/or reports based on approval criteria.

In one embodiment, an instance of each of the objects shown in FIG. 3 may represent a row in a respective table. For example, a data points table may comprise plurality of rows each being an instance of the data point object 302.

It should be noted that the schema, the objects, the attributes of the objects, etc. shown in FIG. 3 are only exemplary and is not intended to limit embodiments in any manner.

Description of FIGS. 4A-4B and 5A-5E

FIG. 4A and FIG. 4B show a flowchart of a process 400 for adding a direct connection, according to some embodiments. FIG. 5A-5E show example screenshots of a user interface presented during process 400. Process 400 is illustrated between a frontend application 122 executing in a client device 102, and a backend application 112 of a web application, and a database 116 in a server system 104. In some embodiments, the adding of direct connections using process 400 would typically involve an administrator (admin user) while other users, such as, for example, client or customer users who have no administrative privileges in the web application, may typically be involved updating of direct connection information using process 700, as shown in FIGS. 7A-7B and will be described below; however, in other embodiments, different types of users and/or combinations of types of users may be involved in one or both of said processes 400, 700. It will be understood that not all operations in process 400 are specifically shown, and that process 400 may include additional operations than shown or may not include one or more shown operations. Moreover, the screenshots are non-limiting examples of a user interface that may be provided.

Operation 402 represents one or more operations to arrive at the starting point for the illustrated portion of process 400. At the starting point, a framework named "8-16 Framework B" and at least one data point named "what are your 2020 scope 2 emissions?" are created and stored in database 116. The database 116 may, of course, have one or more additional frameworks and/or categories stored for use by the web application.

At operation 404, in response to a user input received at the frontend application 122, the server 112 and database 116, operate to retrieve information regarding the selected framework (in this example, the "8-16 Framework B") and its categories, subcategories and associated data points. The backend application 112 then generates the information for screen 500 and transmits the information to the front end application 122 to be displayed.

At operation 406, screen 500 is displayed. Screen 500 shown in FIG. 5A is displayed on the client device by the frontend application 122. Screen 500 enables the user with the ability to add or edit a new data point. The data point name is displayed in an editable field 502.

As can be seen in FIG. 5A, the screen 500 includes a framework builder section 502 and a manage data points section 504. The framework builder section 502 enables the user to add, delete or edit categories and subcategories in the selected framework. In the illustrated example, the framework 8-16 framework B includes a category named "Environmental" which has a subcategory named "Emissions". If the selected framework, includes other categories and/or subcategories, those may also be displayed in screen 500.

The user may select the category, and where subcategories and available and are relevant, also the subcategory that pertains to the data point or data points of interest. If screen 500 was generated by the backend application interacting with the database and displayed by the frontend application, then it may represent that the framework 8-16 framework B includes one category ("Environmental") and one subcategory ("Emissions"), and further that the Emissions subcategory is associated with, or includes, a data point "What are your 2020 scope 2 emissions?" Screen 500 enables the user, at the client device, to edit the name or other attribute of the data point "What are your 2020 scope 2 emissions?"

In addition to the name attribute, a data point may include attributes identifying the data type of the data point and direct connections of the data point. If the data type is identified as numeric (e.g., "Number" data type), further attributes that may be defined include the number of decimal places and the format. If the data type is selected as "character", then further attributes of a character length of the data point may be available. In the illustrated screen 500, a field 508 enables selection of the data type from a menu list that includes number and character data types. An input field 510 enables specifying, or selecting, the number of decimal places. An input field 512 enables selecting the number format using a menu.

At operation 408, the user selects the "Add Direct Connection" button 514 to add one or more direct connections to the selected data point which, in the illustrated screen 500, is the "What is your 2020 Scope 2 Emissions?" data point in field 506.

Figure 5B:
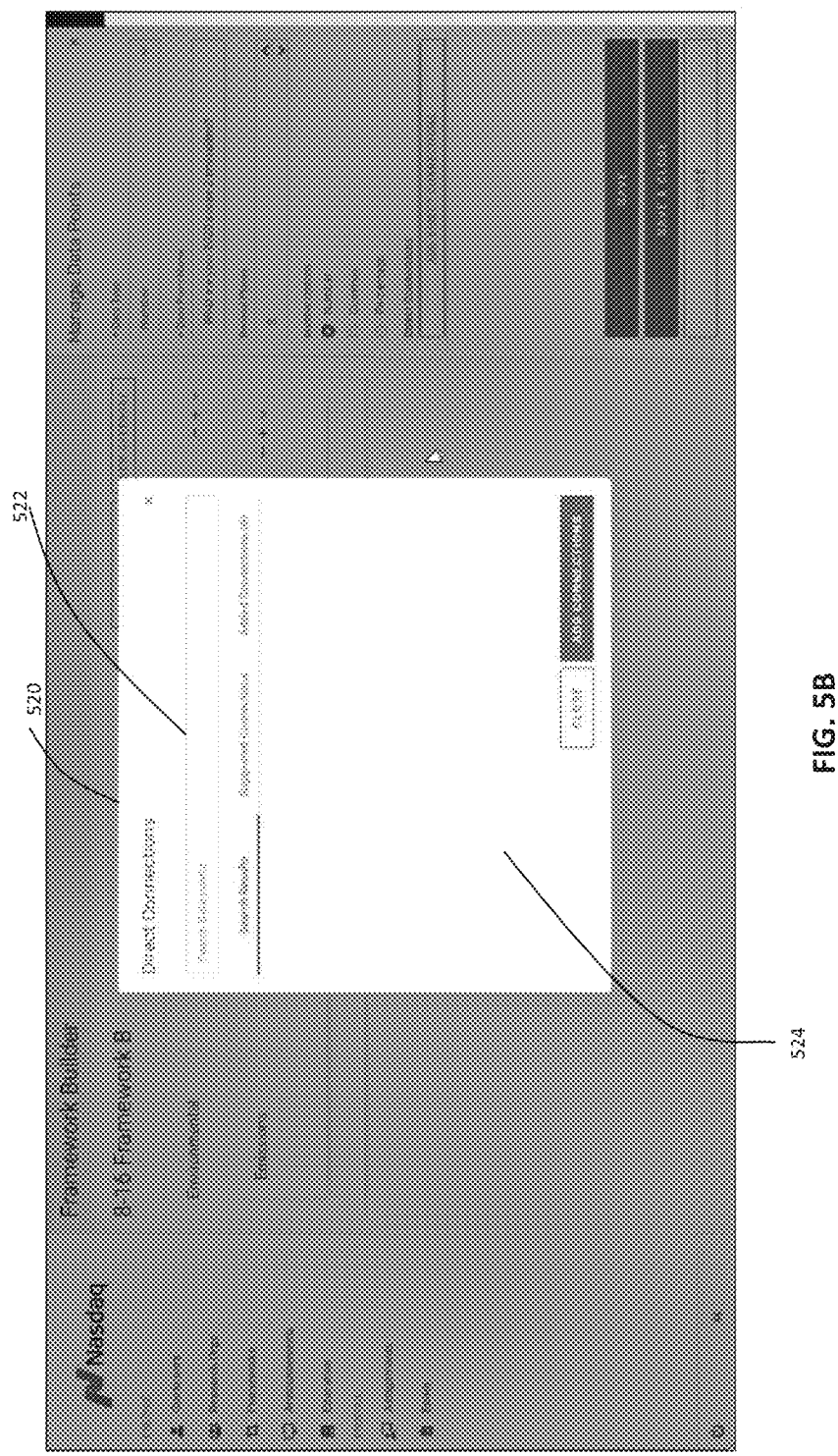

In response to selecting of button 514 "Add Direct Connection", the direct connections popup screen 520 shown in FIG. 5B, is displayed by the front end application 122. Popup screen 520 includes a search input field 522 and a search result area 524.

Operations 410-414 of process 400 are shown in FIG. 4B. At operation 410, the user provides input to screen 520 in order to initiate the search for direct connections, and the search results are displayed in display area 524 of screen 520.

In example embodiments, the search input field 522 in screen 520 may be automatically populated if the "Add Direct Connection" button 514 (e.g. in screen 500) is selected while a particular data point was selected such as in the scenario shown in FIG. 5A, and/or may be manually edited with a full or partial data point name to search for.

An example search is described in relation to FIG. 6. After the search is initiated in response to user input at operation 410 and the search is completed by the backend application 112 and database 116, the search results may be displayed in a list, as shown in FIG. 5C.

Figure 5C:
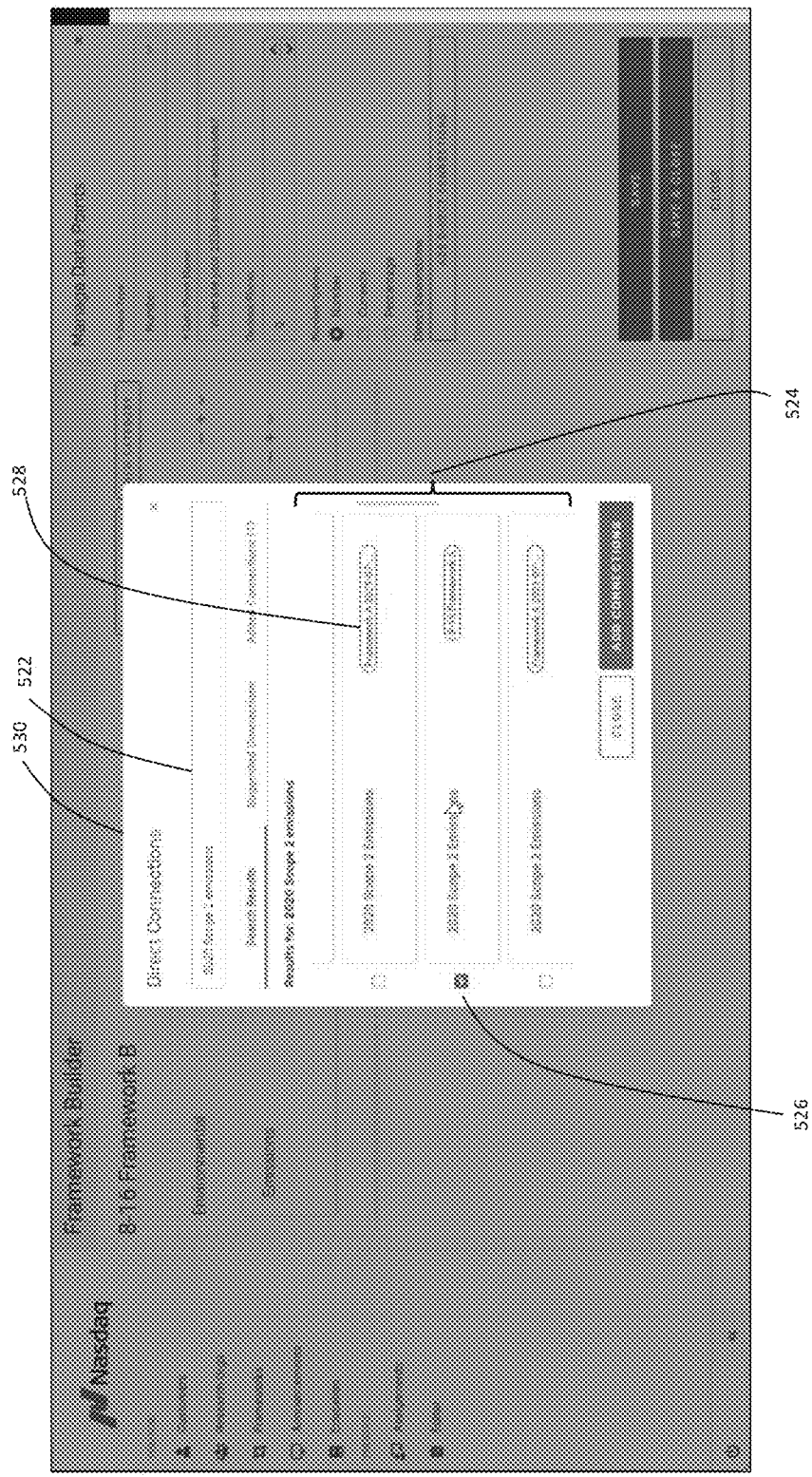

In screen 530 shown in FIG. 5C, the search results are displayed in the area 524 and a selection option (e.g., a checkbox such as checkbox 526) may be provided for each data point in the list of search results. Additionally, the associated framework name (e.g., framework name 528) may also be displayed for each data point in the list of search results for potential direct connections.

Screen 530 illustrates an example of search results when a data point name being queried does not find any matching already existing direct connections. For example, three data points are listed as matching the searched data point name, and all of them are eligible to be selected to be made a direct connection with the searched data point name.

Figure 5D:
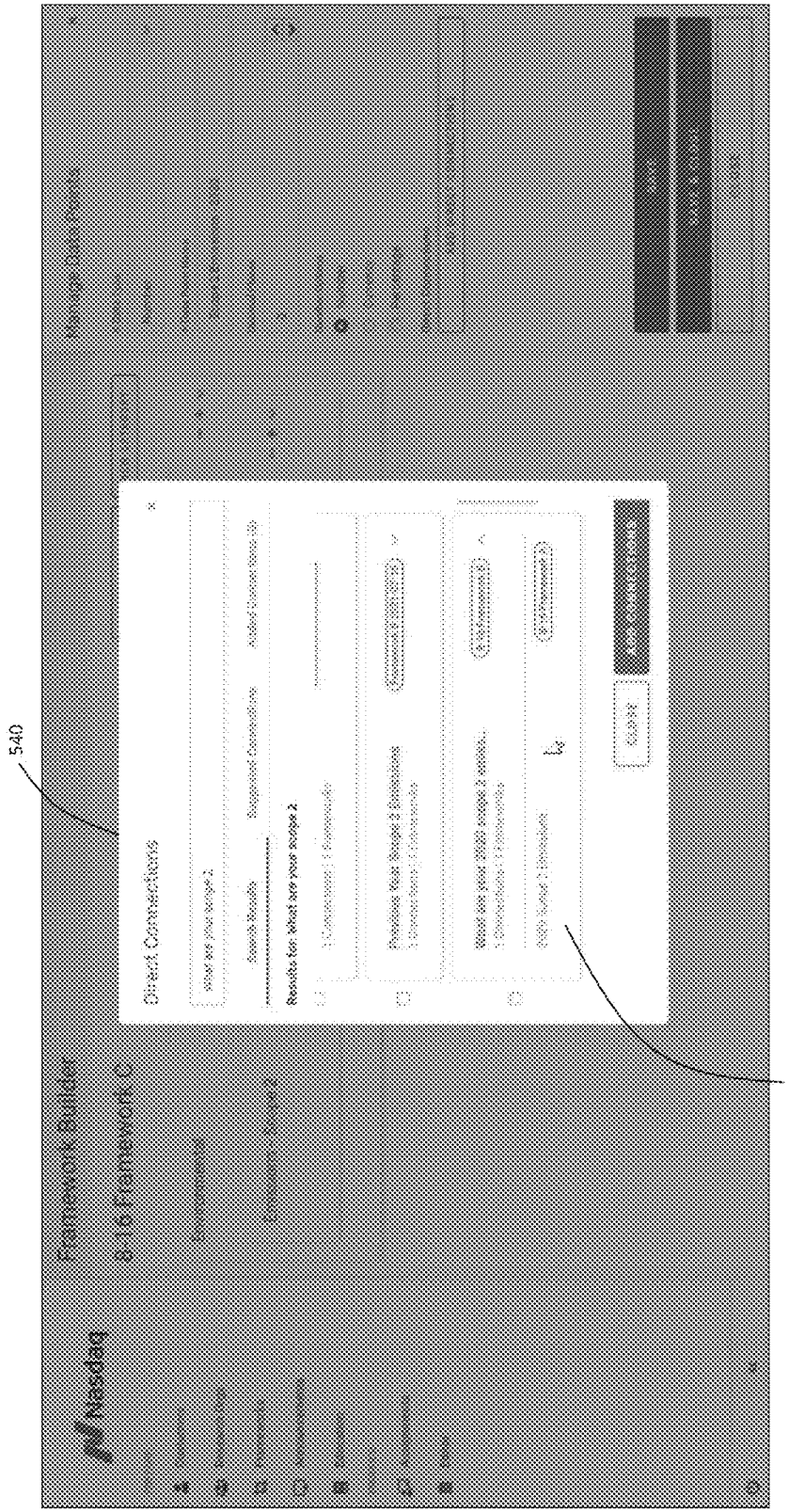

FIG. 5D screen 540 shows an example result list displayed in area 524 when there is already a direct connection with two or more data points matching the search text. In screen 540, the direct connection 542 already has two data points.

When the screen 530 is displayed, at operation 414 the user provides input to initiate creation of a new direct connection. The direct connection is created at the backend application 112 and the database 116 is updated to reflect the updated direct connection.

Figure 5E:
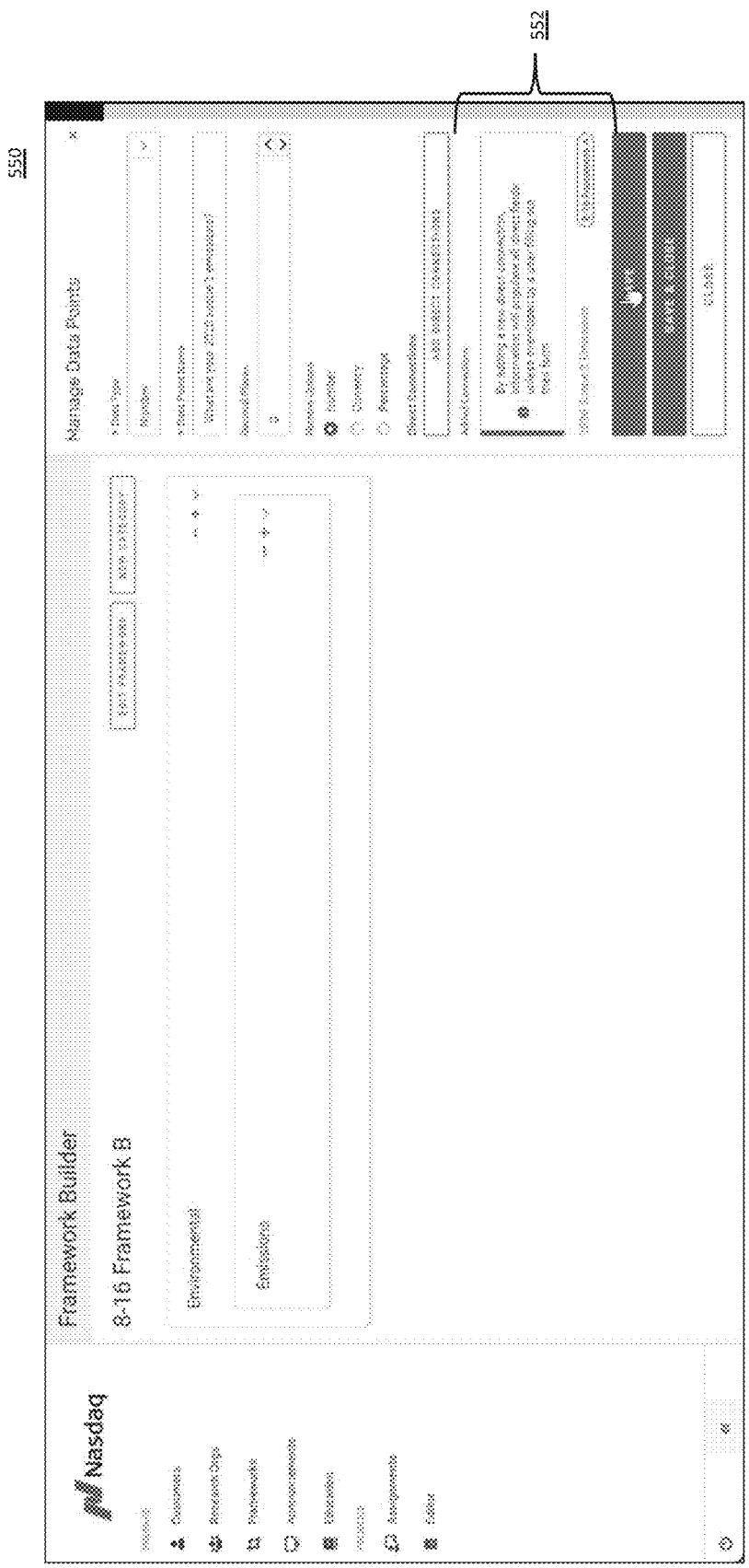

At operation 414, the frontend application 122 displays the manage data points screen incorporating the newly added direct connection information. FIG. 5E illustrates screen 550 which is similar to screen 500 shown in FIG. 5A but for the direct connection information 552 showing the newly added direct connection. Direct connection information 552 indicates that a direct connection exists between "what are your 2020 scope 2 emissions?" data point of 8-16 framework B and "2020 scope 2 emissions" data point of 8-16 framework A.

Description of FIG. 6

FIG. 6 illustrates a search process 600 that may be invoked during operation 410, according to some embodiments. The search process 600 may take as input the term in input field 522 (e.g. in screen 520 shown in FIG. 5B) as the initial search term and returns a list of matching data points.

Operation 602 represents the receiving of the search term. In some embodiments, the search term in input field 522 is automatically populated from the data point name 506 field shown in FIG. 5A. In some embodiments, the user may edit the term in input field 522 before the search is initiated.

At operation 604, chunking of the search term may be performed. In one embodiment chunking is performed based on space characters. However, chunking can be performed based on any one or more predetermined characters or sequence of characters.

At operation 606, stop words are removed from the chunked search term to obtain resulting search words. The stop words may be configurable using, for example, a configuration file that specifies a plurality of stop words.

At operation 608, zero, one or more synonyms may be determined for at least some of the resulting search words. The synonyms may be determined based on an automatic thesaurus lookup.

At operation 610, matching is performed for each of the resulting search words and determined synonyms if any against the database 116 to obtain the result list of matching data points. In some embodiments, the matching is performed on the entire search term, various combinations of the resulting search words, and various combinations of resulting search words with determined synonyms substituted for one or more resulting search words.

At operation 612, optionally, the result list can be ranked according to predetermined ranking criteria. In some example embodiments, the predetermined ranking criteria may specify ranking in accordance with the number of words matched. That is the result data point name that matches most words matched with the queried data point name or with the various combinations of words generated from the search term is listed as the most desirable (highest rank), and the result data point name that matches least words matched with the queried data point name is listed as the least desirable (lowest rank).

In some embodiments, in addition to the matching based on words, the matching may also consider properties of the queried data point and each of the data points returned as results. For example, if the queried data point has a menu selectable response value (as specified in the respective data point structure or the associated layout structure, see FIG. 3), then only those data points from the result list that also have a menu selectable response value are selected to be presented as potential direct connections. Another property for matching may be the data type (e.g., number, character, etc.) of the response value associated with each data point sought to be matched.

Additionally, the result list of matching data points may be consolidated by removing any duplicates. For example, in some embodiments, since when a match occurs on a particular data point, its direct connect data points are also included in the result list, a data point that reappears as a lower ranked match or a direct connected data point of a lower ranked match may be removed from the result list in favor of that data points appearance in relation to a higher rank.

The illustrated search process 600 is an example, and it will be understood that one or more steps may not be performed, or one or more additional steps may be performed, in embodiments.

Description of FIGS. 7A-7C and 8A-8E

FIGS. 7A, 7B and 7C show a process 700 for a user to update direct connection information, according to some embodiments. FIGS. 8A-8F show example screenshots of a user interface presented during process 700. Process 700 is illustrated between a frontend application 122 executing in a client device 102, and a backend application 112 and a database 116 in a server system 104. In some embodiments, the updating of direct connection information using process 700 would typically involve client or customer users who have no administrative privileges in the web application; but in some embodiments, an administrator (admin user) may be involved in process 700; alternatively or additionally, in yet other embodiments, different types of users and/or combinations of types of users may be involved in process 700. It will be understood that not all operations in process 700 are specifically shown, and that process 700 may include additional operations than shown or may not include one or more shown operations. Moreover, the screenshots are non-limiting examples of a user interface that may be provided.

Operations 702 represents one or more operations to arrive at the starting point for the illustrated portion of process 700. At the starting point, a framework named "8-16 Framework B" which has at least one data point named "what are your 2020 scope 2 emissions?" has been created and stored in database 116.

At operation 704, in response to a user input received at the frontend application 122, the backend application 112 and database 116 operate to retrieve information regarding the selected framework (in this example, the "8-16 Framework B") and its categories, subcategories and associated data points. The backend application 112 then generates the information for screen 800 and transmits the information to the front end application 122 to be displayed.

At operation 706, screen 800 is displayed. Screen 800 shown in FIG. 8A is displayed on the client device by the frontend application 122. Screen 800 enables the user to update direct connection data. The answer to the data point is requested in an editable input field 806.

As can be seen in FIG. 8A, the screen 800 includes a framework section 802, a category section 804 and a subcategory section 806. In the example, the framework section 802 is displayed for "8-16 framework B". Although only one category, the category named "Environmental" is displayed in the framework section 802, in some embodiments, a scrollable list of all categories defined in the database 116 for the selected framework is displayed. For each category, all the subcategories, if any, defined within that category may be displayed. In the example, the subcategory "Emissions" 806 is the only subcategory defined within the "Environmental" category. For each subcategory or category, the data points defined are displayed in a manner in which the response value associated with the data point is editable. For example, the data point 808 "what are your scope 2 emissions?" is displayed in the subcategory for Emissions, with an editable input field 809 in which the user input can be received.

At operation 708, a user input on the input field 809 is received, and in response, screen 810 is displayed. Screen 810 is shown in FIG. 8B, and represents a data point details editing screen. In the illustrated embodiment, the framework information display area 812 is grayed out and a data point detail panel 814 is made visible and active on the right sight of the display as shown in FIG. 8B. The data point detail panel 814 displays the direct connections for the data point for which the panel was invoked (e.g., data point 808).

Panel 814, may be tabbed such that different aspects of the data point 808 information can be displayed. A "Direct Connections" tab 816 displays a list including the data point 808 and all data points to which data point 808 is directly connected. For each data point in the list, the data point name, the associated category and/or subcategory, and the associated framework is displayed. For each data point in the list, an input field populated with the current response value to the data point is also displayed. Still further, for each data point in the list, an "override" input field is provided for the user to indicate whether that data point's response value is to override the response value that is regarded as the common response value for all data points of that direct connection. For example, for data point 808, its name 820, its subcategory 822, its framework 824, an input field 826 for the response value, and a radio button (or other selectable input field) 828 to indicate whether it is an override response value is shown.

At operation 710, shown in FIG. 7B, the user interacts with the data point details panel 814, and may enter and/or edit the response value for the data point 808. FIG. 8C shows screen 820 when the user enters a response value of "50,000" to the response value input field 826 for data point 808.

The frontend application 122 updates the response value fields of each of the other data points in the list, which are directly connected to data point 808. In some example embodiments, the updating occurs in real time character-by-character as the user is typing in the input field 826. In some other embodiments, the other response values are updated in the panel 814 only when the user indicates completion of entry into input field 826, for example, by hitting enter or mouse click.

It should be noted that the updating of the response values for all data points direct connected to the data point 808 was performed because none of the direct connected data points is currently configured as an override. That is, when the response value for a data point that is not currently configured as an override is updated to a new value, the response values of all data points that are directly connected and are not themselves configured as overrides are updated to be identical to the new value. Any data point that is currently configured as an override, will neither have its response value updated due to an update of a response value of any directly connected data point, nor will the system update the response value of its direct connected data points in response to any updates to its response value.

When the user indicates that the configuration of the data point details is complete, such as, for example, by clicking on a "save" button, at operation 712, data point information for each of the data points listed in the direct connection tab is transmitted from the frontend application to the backend application. The transmitted data point information for each data point includes the data point id, the response value, and status of the override flag.

At operation 714, the backend application 112 updates the data point information in the database 116 in accordance with the data received from the frontend application 122.

At operation 716, the backend application 112, after updating the data point values, returns updated information for the frontend application 122 to display screen 830. Screen 830 is shown in FIG. 8D, and indicates that the most recently submitted data point information changes were successfully saved. Screen 830 is similar to screen 810 in which the user can select a data point to edit its information, but has the current response value for data point 808 updated.

FIG. 7C shows operations 710'-716' which are identical to the above described operations 710-716 shown in FIG. 7B, except that, at operation 710' the direct connected data points include a data point that is configured as an override. Screen 840 shown in FIG. 8E illustrates data point details panel 814 with one of the direct connected data points 842 being configured as an override value. In this scenario, when the response value of data point 808 is updated, for example, in operation 710', to the new value of 50,000 in the input field 826, while the response value of data point 844 is updated to the new value because it is not configured as an override (see corresponding override button being set to false/off), the response value of data point 842, which is configured as an override (see override button 842 being set to true/on), is not updated to the new value and remains at its current value of 20,000.

In the scenario of screen 840 too, in response to the user selecting the save button to save the settings, at operation 712', data point information for each of the data points listed in the direct connection tab is transmitted from the frontend application 122 to the backend application 112. The transmitted data point information for each data point includes the data point id, the response value, and status of the override flag. The operations 714' and 716' operates similar to operations 714 and 716 in the scenario described above in relation to screen 810, and at the end of operation 716' the screen 850 shown in FIG. 8F is displayed enabling the user to select another data point for editing in the same framework.

Description of FIGS. 9A-9B

FIGS. 9A and 9B illustrate the data structures representing the data points that are made available for editing in the scenarios of screen 810 shown in FIG. 8B and the screen 840 shown in FIG. 8E, respectively, according to some embodiments. More specifically, FIG. 9A shows data structures in a scenario where none of the direct connected data points are configured as an override, as shown in screen 810 in FIGS. 8B-8C, and FIG. 9B shows data structures in a scenario where none of the direct connected data points are configured as an override, as shown in screen 840 in FIG. 8E.

FIG. 9A illustrates the initial state 902 of data points B, G and Z where none of them are configured as overrides, their transmitted state 904 when transmitted from the frontend application to the backend application, and their updated state 906 after the backend application received the updated data from the frontend application. In the initial state 902, data point B 910 from framework "8-16 framework A", data point G 912 from framework "8-16 framework B", and data point Z 914 from framework "8-16 framework C", which are each directly connected to the other two, each has a response value of null and has its override flag set to false. The data point information sent from the backend application 112 to the frontend application 122 in the previously described operations 704-708 include the data points in the initial state 902.

In the transmitted state 904, each of the data points have the same value of "50,000" which was entered by the user as the response value in the input field for the data point G "what are your 2020 Emissions?". Since no data point in the group was configured as an override, the new response value entered by the user for data point G was propagated to both other data points in the direct connected group.

In the updated state 906, data points B, G and Z are saved in relation to their respective frameworks. They each have a response value of "50,000" in accordance with the new value entered for data point G, and each override flag remains set to false.

FIG. 9B illustrates the initial state 922 of data points B, G and Z where one of them is configured as an override, their transmitted state 924 when transmitted from the frontend application to the backend application, and their updated state 926 after the backend application received the updated data from the frontend application.

The initial state 922 is identical to initial state 902 described above, except for the response value of data point B being "20,000" and its override flag being set to true.

The transmitted state 924 represents the data points that after being edited in screen 850 shown in FIG. 8E to enter a new response value of "50,000" for data point G, are transmitted from the frontend application to the backend application. In the transmitted data structure, the data points G and Z have the same value of "50,000" and override flags set to false, while data point A has maintained its initial value of "20,000" with the override flag being true.

The updated state 926 is identical to the updated state 906 described above, except for the response value of data point A being "20,000" and its override flag being set to true.

Description of FIG. 10

FIG. 10 is a block diagram of an example computing device 1000 (which may also be referred to, for example, as a "computing device," "computer system," or "computing system") according to some embodiments. The client device 102, server systems 104 and the like in system 100 may each include one or more computing devices 1000. In some embodiments, the computing device 1000 includes one or more of the following: one or more processors 1002 (which may be referred to as "hardware processors" or individually as a "hardware processor"); one or more memory devices 1004; one or more network interface devices 1006; one or more display interfaces 1008; and one or more user input adapters 1010. Additionally, in some embodiments, the computing device 1000 is connected to or includes a display device 1012. As will explained below, these elements (e.g., the processors 1002, memory devices 1004, network interface devices 1006, display interfaces 1008, user input adapters 1010, display device 1012) are hardware devices (for example, electronic circuits or combinations of circuits) that are configured to perform various different functions for the computing device 1000. In some embodiments, these components of the computing device 1000 may be collectively referred to as computing resources (e.g., resources that are used to carry out execution of instructions and include the processors (one or more processors 1002), storage (one or more memory devices 1004), and I/O (network interface devices 1006, one or more display interfaces 1008, and one or more user input adapters 1010). In some instances, the term processing resources may be used interchangeably with the term computing resources. In some embodiments, multiple instances of computing device 1000 may arranged into a distributed computing system.

In some embodiments, each or any of the processors 1002 is or includes, for example, a single- or multi-core processor, a microprocessor (e.g., which may be referred to as a central processing unit or CPU), a digital signal processor (DSP), a microprocessor in association with a DSP core, an Application Specific Integrated Circuit (ASIC), a Field Programmable Gate Array (FPGA) circuit, or a system-on-a-chip (SOC) (e.g., an integrated circuit that includes a CPU and other hardware components such as memory, networking interfaces, and the like). And/or, in some embodiments, each or any of the processors 1002 uses an instruction set architecture such as x86 or Advanced RISC Machine (ARM).

In some embodiments, each or any of the memory devices 1004 is or includes a random access memory (RAM) (such as a Dynamic RAM (DRAM) or Static RAM (SRAM)), a flash memory (based on, e.g., NAND or NOR technology), a hard disk, a magneto-optical medium, an optical medium, cache memory, a register (e.g., that holds instructions), or other type of device that performs the volatile or non-volatile storage of data and/or instructions (e.g., software that is executed on or by processors 1002). Memory devices 1004 are examples of non-transitory computer-readable storage media.

In some embodiments, each or any of the network interface devices 1006 includes one or more circuits (such as a baseband processor and/or a wired or wireless transceiver), and implements layer one, layer two, and/or higher layers for one or more wired communications technologies (such as Ethernet (IEEE 802.3)) and/or wireless communications technologies (such as Bluetooth, WiFi (IEEE 802.11), GSM, CDMA2000, UMTS, LTE, LTE-Advanced (LTE-A), LTE Pro, Fifth Generation New Radio (5G NR) and/or other short-range, mid-range, and/or long-range wireless communications technologies). Transceivers may comprise circuitry for a transmitter and a receiver. The transmitter and receiver may share a common housing and may share some or all of the circuitry in the housing to perform transmission and reception. In some embodiments, the transmitter and receiver of a transceiver may not share any common circuitry and/or may be in the same or separate housings.

In some embodiments, data is communicated over an electronic data network (e.g., network 106 in FIG. 1). An electronic data network includes implementations where data is communicated from one computer process space to computer process space and thus may include, for example, inter-process communication, pipes, sockets, and communication that occurs via direct cable, cross-connect cables, fiber channel, wired and wireless networks, and the like. In certain examples, network interface devices 1006 may include ports or other connections that enable such connections to be made and communicate data electronically among the various components of a distributed computing system.

In some embodiments, each or any of the display interfaces 1008 is or includes one or more circuits that receive data from the processors 1002, generate (e.g., via a discrete GPU, an integrated GPU, a CPU executing graphical processing, or the like) corresponding image data based on the received data, and/or output (e.g., a High-Definition Multimedia Interface (HDMI), a DisplayPort Interface, a Video Graphics Array (VGA) interface, a Digital Video Interface (DVI), or the like), the generated image data to the display device 1012, which displays the image data. Alternatively or additionally, in some embodiments, each or any of the display interfaces 1008 is or includes, for example, a video card, video adapter, or graphics processing unit (GPU).

In some embodiments, each or any of the user input adapters 1010 is or includes one or more circuits that receive and process user input data from one or more user input devices (not shown in FIG. 10) that are included in, attached to, or otherwise in communication with the computing device 1000, and that output data based on the received input data to the processors 1002. Alternatively or additionally, in some embodiments each or any of the user input adapters 1010 is or includes, for example, a PS/2 interface, a USB interface, a touchscreen controller, or the like; and/or the user input adapters 1010 facilitates input from user input devices (not shown in FIG. 10) such as, for example, a keyboard, mouse, trackpad, touchscreen, etc.

In some embodiments, the display device 1012 may be a Liquid Crystal Display (LCD) display, Light Emitting Diode (LED) display, or other type of display device. In embodiments where the display device 1012 is a component of the computing device 1000 (e.g., the computing device and the display device are included in a unified housing), the display device 1012 may be a touchscreen display or non-touchscreen display. In embodiments where the display device 1012 is connected to the computing device 1000 (e.g., is external to the computing device 1000 and communicates with the computing device 1000 via a wire and/or via wireless communication technology), the display device 1012 is, for example, an external monitor, projector, television, display screen, etc.

In various embodiments, the computing device 1000 includes one, or two, or three, four, or more of each or any of the above-mentioned elements (e.g., the processors 1002, memory devices 1004, network interface devices 1006, display interfaces 1008, and user input adapters 1010). Alternatively or additionally, in some embodiments, the computing device 1000 includes one or more of: a processing system that includes the processors 1002; a memory or storage system that includes the memory devices 1004; and a network interface system that includes the network interface devices 1006. Alternatively, or additionally, in some embodiments, the computing device 1000 includes a system-on-a-chip (SoC) or multiple SoCs, and each or any of the above-mentioned elements (or various combinations or subsets thereof) is included in the single SoC or distributed across the multiple SoCs in various combinations. For example, the single SoC (or the multiple SoCs) may include the processors 1002 and the network interface devices 1006; or the single SoC (or the multiple SoCs) may include the processors 1002, the network interface devices 1006, and the memory devices 1004; and so on. The computing device 1000 may be arranged in some embodiments such that: the processors 1002 include a multi or single-core processor; the network interface devices 1006 include a first network interface device (which implements, for example, WiFi, Bluetooth, NFC, etc.) and a second network interface device that implements one or more cellular communication technologies (e.g., 3G, 4G LTE, CDMA, etc.); the memory devices 1004 include RAM, flash memory, or a hard disk. As another example, the computing device 1000 may be arranged such that: the processors 1002 include two, three, four, five, or more multi-core processors; the network interface devices 1006 include a first network interface device that implements Ethernet and a second network interface device that implements WiFi and/or Bluetooth; and the memory devices 1004 include a RAM and a flash memory or hard disk.

As previously noted, whenever it is described in this document that a software module or software process performs any action, the action is in actuality performed by underlying hardware elements according to the instructions that comprise the software module. Consistent with the foregoing, in various embodiments, each or any combination of the (e.g., the client device 102, the server system 104, etc.), each of which will be referred to individually for clarity as a "component" for the remainder of this paragraph, are implemented using an example of the computing device 1000 of FIG. 10. In such embodiments, the following applies for each component: (a) the elements of the 1000 computing device 1000 shown in FIG. 10 (i.e., the one or more processors 1002, one or more memory devices 1004, one or more network interface devices 1006, one or more display interfaces 1008, and one or more user input adapters 1010), or appropriate combinations or subsets of the foregoing) are configured to, adapted to, and/or programmed to implement each or any combination of the actions, activities, or features described herein as performed by the component and/or by any software modules described herein as included within the component; (b) alternatively or additionally, to the extent it is described herein that one or more software modules exist within the component, in some embodiments, such software modules (as well as any data described herein as handled and/or used by the software modules) are stored in the memory devices 1004 (e.g., in various embodiments, in a volatile memory device such as a RAM or an instruction register and/or in a non-volatile memory device such as a flash memory or hard disk) and all actions described herein as performed by the software modules are performed by the processors 1002 in conjunction with, as appropriate, the other elements in and/or connected to the computing device 1000 (i.e., the network interface devices 1006, display interfaces 1008, user input adapters 1010, and/or display device 1012); (c) alternatively or additionally, to the extent it is described herein that the component processes and/or otherwise handles data, in some embodiments, such data is stored in the memory devices 1004 (e.g., in some embodiments, in a volatile memory device such as a RAM and/or in a non-volatile memory device such as a flash memory or hard disk) and/or is processed/handled by the processors 1002 in conjunction, as appropriate, the other elements in and/or connected to the computing device 1000 (i.e., the network interface devices 1006, display interfaces 1008, user input adapters 1010, and/or display device 1012); (d) alternatively or additionally, in some embodiments, the memory devices 1002 store instructions that, when executed by the processors 1002, cause the processors 1002 to perform, in conjunction with, as appropriate, the other elements in and/or connected to the computing device 1000 (i.e., the memory devices 1004, network interface devices 1006, display interfaces 1008, user input adapters 1010, and/or display device 1012), each or any combination of actions described herein as performed by the component and/or by any software modules described herein as included within the component.

The hardware configurations shown in FIG. 10 and described above are provided as examples, and the subject matter described herein may be utilized in conjunction with a variety of different hardware architectures and elements. For example: in many of the Figures in this document, individual functional/action blocks are shown; in various embodiments, the functions of those blocks may be implemented using (a) individual hardware circuits, (b) using an application specific integrated circuit (ASIC) specifically configured to perform the described functions/actions, (c) using one or more digital signal processors (DSPs) specifically configured to perform the described functions/actions, (d) using the hardware configuration described above with reference to FIG. 10, (e) via other hardware arrangements, architectures, and configurations, and/or via combinations of the technology described in (a) through (e).

Technical Advantages of Described Subject Matter

In certain example embodiments, techniques are provided for efficiently configuring connections between data points of the same and/or different data frameworks, and using those configured connections, efficiently propagate changes made to one of the data points in a first data framework to connected data points in respective other data frameworks as needed, while also providing for selected ones of the connected data points override such propagated changes. The connections described in this disclosure provides a technique for propagating changes that occurs in relation to one data point in a first data framework to other data points in the same and/or other frameworks even if the other data points are syntactically not identical to the changed data point. Thus, the techniques may improve the accuracy and consistency of data used across many reports generated by a system.

Additionally, the user interfaces described in relation to the embodiments provide users with previously unavailable capabilities to view and simultaneously act upon connected or potentially connectable data points across data frameworks while also providing the capability to override certain ones of the connected data points.

Still further, the connections established between data items across different data frameworks, may, by providing direct access between the related data points, result in reduced system resources (e.g. processing power, memory, etc.) being consumed by searching for related items in respective data frameworks.

The technical features described herein may thus improve the efficiency with which data points contained in different data collections or frameworks in a database are updated in an accurate and consistent manner, in response to a change of configuration that occurs in relation to one of the data points.

Selected Terminology

The elements described in this document include actions, features, components, items, attributes, and other terms. Whenever it is described in this document that a given element is present in "some embodiments," "various embodiments," "certain embodiments," "certain example embodiments, "some example embodiments," "an exemplary embodiment," "an example," "an instance," "an example instance," or whenever any other similar language is used, it should be understood that the given element is present in at least one embodiment, though is not necessarily present in all embodiments. Consistent with the foregoing, whenever it is described in this document that an action "may," "can," or "could" be performed, that a feature, element, or component "may," "can," or "could" be included in or is applicable to a given context, that a given item "may," "can," or "could" possess a given attribute, or whenever any similar phrase involving the term "may," "can," or "could" is used, it should be understood that the given action, feature, element, component, attribute, etc. is present in at least one embodiment, though is not necessarily present in all embodiments.

Terms and phrases used in this document, and variations thereof, unless otherwise expressly stated, should be construed as open-ended rather than limiting. As examples of the foregoing: "and/or" includes any and all combinations of one or more of the associated listed items (e.g., a and/or b means a, b, or a and b); the singular forms "a", "an", and "the" should be read as meaning "at least one," "one or more," or the like; the term "example", which may be used interchangeably with the term embodiment, is used to provide examples of the subject matter under discussion, not an exhaustive or limiting list thereof; the terms "comprise" and "include" (and other conjugations and other variations thereof) specify the presence of the associated listed elements but do not preclude the presence or addition of one or more other elements; and if an element is described as "optional," such description should not be understood to indicate that other elements, not so described, are required.

As used herein, the term "non-transitory computer-readable storage medium" includes a register, a cache memory, a ROM, a semiconductor memory device (such as D-RAM, S-RAM, or other RAM), a magnetic medium such as a flash memory, a hard disk, a magneto-optical medium, an optical medium such as a CD-ROM, a DVD, or Blu-Ray Disc, or other types of volatile or non-volatile storage devices for non-transitory electronic data storage. The term "non-transitory computer-readable storage medium" does not include a transitory, propagating electromagnetic signal.

The claims are not intended to invoke means-plus-function construction/interpretation unless they expressly use the phrase "means for" or "step for." Claim elements intended to be construed/interpreted as means-plus-function language, if any, will expressly manifest that intention by reciting the phrase "means for" or "step for"; the foregoing applies to claim elements in all types of claims (method claims, apparatus claims, or claims of other types) and, for the avoidance of doubt, also applies to claim elements that are nested within method claims. Consistent with the preceding sentence, no claim element (in any claim of any type) should be construed/interpreted using means plus function construction/interpretation unless the claim element is expressly recited using the phrase "means for" or "step for."

Whenever it is stated herein that a hardware element (e.g., a processor, a network interface, a display interface, a user input adapter, a memory device, or other hardware element), or combination of hardware elements, is "configured to" perform some action, it should be understood that such language specifies a physical state of configuration of the hardware element(s) and not mere intended use or capability of the hardware element(s). The physical state of configuration of the hardware elements(s) fundamentally ties the action(s) recited following the "configured to" phrase to the physical characteristics of the hardware element(s) recited before the "configured to" phrase. In some embodiments, the physical state of configuration of the hardware elements may be realized as an application specific integrated circuit (ASIC) that includes one or more electronic circuits arranged to perform the action, or a field programmable gate array (FPGA) that includes programmable electronic logic circuits that are arranged in series or parallel to perform the action in accordance with one or more instructions (e.g., via a configuration file for the FPGA). In some embodiments, the physical state of configuration of the hardware element may be specified through storing (e.g., in a memory device) program code (e.g., instructions in the form of firmware, software, etc.) that, when executed by a hardware processor, causes the hardware elements (e.g., by configuration of registers, memory, etc.) to perform the actions in accordance with the program code.

A hardware element (or elements) can be therefore be understood to be configured to perform an action even when the specified hardware element(s) is/are not currently performing the action or is not operational (e.g., is not on, powered, being used, or the like). Consistent with the preceding, the phrase "configured to" in claims should not be construed/interpreted, in any claim type (method claims, apparatus claims, or claims of other types), as being a means plus function; this includes claim elements (such as hardware elements) that are nested in method claims.

Additional Applications of Described Subject Matter

Although process steps, algorithms or the like, including without limitation with reference to FIGS. 4A-9, may be described or claimed in a particular sequential order, such processes may be configured to work in different orders. In other words, any sequence or order of steps that may be explicitly described or claimed in this document does not necessarily indicate a requirement that the steps be performed in that order; rather, the steps of processes described herein may be performed in any order possible. Further, some steps may be performed simultaneously (or in parallel) despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary, and does not imply that the illustrated process is preferred.

Although various embodiments have been shown and described in detail, the claims are not limited to any particular embodiment or example. None of the above description should be read as implying that any particular element, step, range, or function is essential. All structural and functional equivalents to the elements of the above-described embodiments that are known to those of ordinary skill in the art are expressly incorporated herein by reference and are intended to be encompassed. Moreover, it is not necessary for a device or method to address each and every problem sought to be solved by the present invention, for it to be encompassed by the invention. No embodiment, feature, element, component, or step in this document is intended to be dedicated to the public.

The invention claimed is:

1. A system comprising:
   a server system comprising:
      a memory storing report information associated with a plurality of reports, the report information comprising, for each report, a report name, one or more data points for each of at least one data category, and a result value for each of the one or more data points; and
      a first processing system coupled to the memory and comprising at least one processor; and
   a client device comprising:
      a display; and
      a second processing system comprising at least one processor, the second processing system configured to:
         in response to receiving a user input in association with a first data point displayed in a first display area of the display, display the first data point and a plurality of other data points in a second display area of the display, wherein each of the other data points is associated, in said memory of the server system, with at least the first data point, and wherein each of the first data point and the other data points are associated, in the memory of the server system, with respectively different reports of the plurality of reports;

update, in response to receiving a first result value in a user input provided to an input field associated with the first data point, a respective displayed result value associated with each of the other data points to the first result value or another result value in accordance with at least a respective flag associated with said each other data points;

display a respective selectable input field associated with each displayed other data points and the first data point in the second display area, each of the selectable input fields indicating a current status of the respective flag associated with each said displayed other data points and the first data point;

receive user input on at least one of the respective selectable input fields;

update the current status of the respective flag associated with the each other data points and the first data point in accordance with the user input received on said at least one of the respective selectable input field; and transmit information associated with the first data point and each said other data points to the server system, wherein the information associated with the first data point includes the first result value and the information associated with each said other data points includes the updated respective result value of each said other data points;

wherein the first processing system of the server system is configured to receive the transmitted information and update the report information in the memory in accordance with the transmitted information.

2. The system according to claim 1, wherein the second processing system of the client device is further configured to:

receive user input on one of the respective selectable input fields selecting to override and on another one of the respective selectable input fields selecting not to override; and update the respective displayed result value associated with said one of the respective selectable input fields selected to override to maintain its result value and update the respective displayed result value associated with said another one of the respective selectable input fields selected to not override to the result value of the first data point.

3. The system according to claim 1, wherein the first processing system of the server system is configured to form, in the memory, a one-to-one association between each of the other data points and the first data point.

4. The system according to claim 1, wherein the first processing system of the server system is further configured to store, in the memory, a bidirectional one-to-one association between each of the other data points and the first data point.

5. The system according to claim 1, wherein the first processing system of the server system is further configured to store for a group of data points comprising the other data points and the first data point, in the memory, a one-to-one association from each data point in the group to each of the other data points in the group.

6. The system according to claim 1, wherein the first data point is displayed in the first display area simultaneously with the first data point and the plurality of other data points being displayed in the second display area of the display.

7. The system according to claim 1, wherein:

the second processing system of the client device is further configured to:

display, in response to a user input selecting a second data point of a first report of the plurality of reports, one or more other data points of one or more other reports of the plurality of reports, wherein the one or more data items are identified based on similarity of a name of the second data point compared to names of the one or more other data points; and transmit, in response to a user input selecting at least one of the displayed one or more other data points, information associating the second data point and the selected at least one of the displayed other data points; and the first processing system of the server system is further configured to:

store in the memory of the server system, in the report information, a one-to-one connection between the second data point and the selected at least of the displayed other data points.

8. The system according to claim 7, wherein the one-to-one connection between the second data point and the selected at least of the displayed other data points is a bidirectional one-to-one connection.

9. The system according to claim 7, wherein the displaying one or more other data points of one or more other reports of the plurality of reports comprises:

receiving a search term based on a name of the second data point;

initiating a search of the stored report information based on the search term; and performing the displaying one or more other data points of one or more other reports of the plurality of reports, wherein the one or more other data points are returned as results from the initiated search.

10. The system according to claim 9, wherein the first processing system of the server system is configured to perform operations that include:

performing the initiated search of the stored report information based on the search term; and obtaining the one or more other data points returned as results from the search.

11. The system according to claim 10, wherein the performing the initiated search comprises:

generating additional search terms based upon synonyms associated with the search term; and performing the initiated search of the stored report information based on the search term and the generated additional search terms.

12. The system according to claim 11, wherein the performing the initiated search comprises:

after the obtaining the one or more other data points, ranking the obtained one or more other data points according to a predetermined ranking criteria; and wherein the second processing system of the client device is further configured to arrange the one or more other data points in the second display area in accordance with the ranking.

13. A client device comprising:

a display;

a processing system comprising at least one processor, the processing system configured to:

display, in response to receiving a user input in association with a first data point displayed in a first display area of the display, the first data point and a plurality of other data points in a second display area of the display, wherein each of the other data points is associated, in a memory of a server system, with at least the first data point, and wherein each of the first data point and the other data points are associated, in the memory, with respectively different reports of the plurality of reports;

update, in response to receiving a first result value in a user input provided to an input field associated with the first data point, a respective displayed result value associated with each of the other data points to the first result value or another result value based upon at least a respective flag associated with said each other data point;

display a respective selectable input field associated with each displayed other data points and the first data point in the second display area, each of the selectable input fields indicating a current status of the respective flag associated with each said displayed other data points and the first data point;

receive user input on at least one of the respective selectable input fields;

update the current status of the respective flag associated with the each other data points and the first data point in accordance with the user input received on said at least one of the respective selectable input field; and transmit information associated with the first data point and each said other data points to the server system, wherein the information associated with the first data point includes the first result value and the information associated with each said other data points include the updated respective result value of each said other data points.

14. A server system:
a memory storing report information associated with a plurality of reports, the report information comprising, for each report, a report name, one or more data points for each of at least one data category, and a result value for each of the one or more data points; and a processing system coupled to the memory and comprising at least one processor configured to perform operations comprising:

responsive to a request from a client device, transmitting a first data point and a plurality of other data points for display on the client device, wherein each of the other data points is associated, in said memory, with at least the first data point, and wherein each of the first data point and the other data points are associated, in the memory, with respectively different reports of the plurality of reports;

receiving information associated with the first data point and each said other data points from the client device, wherein the information associated with the first data point includes a first result value and the information associated with each said other data points includes the updated respective result value of each said other data points, and wherein, the client device, in response to receiving the first result value in a user input provided to an input field associated with the first data point, updates a respective displayed result value associated with each of the other data points to the first result value or another result value based upon at least a respective flag associated with said each other data points updates, in response to receiving user input on at least one of the respective selectable input fields associated with each displayed other data points and the first data point in the second display area, a current status of the respective flag associated with the each other data points and the first data point in accordance with the user input received on said at least one of the respective selectable input fields; and updating the report information in the memory in accordance with the transmitted information.

15. A method performed by at least one processor, the method comprising:

in response to receiving a user input in association with a first data point displayed in a first display area of a display, displaying the first data point and a plurality of other data points in a second display area of the display, wherein each of the other data points is associated, in a memory of a server system, with at least the first data point, and wherein each of the first data point and the other data points are associated, in the memory, with respectively different reports of a plurality of reports stored in the memory;

in response to receiving a first result value in a user input provided to an input field associated with the first data point, updating a respective displayed result value associated with each of the other data points to the first result value or another result value based upon at least a respective flag associated with said each other data points;

display a respective selectable input field associated with each displayed other data points and the first data point in the second display area, each of the selectable input fields indicating a current status of the respective flag associated with each said displayed other data points and the first data point;

receive user input on at least one of the respective selectable input fields;

update the current status of the respective flag associated with the each other data points and the first data point in accordance with the user input received on said at least one of the respective selectable input field; and transmitting information associated with the first data point and each said other data points to the server system, wherein the information associated with the first data point includes the first result value and the information associated with each said other data points include the updated respective result value of said each other data points.

16. The method according to claim 15, further comprising:

receive user input on one of the respective selectable input fields selecting to override and on another one of the respective selectable input fields selecting not to override; and update the respective displayed result value associated with said one of the respective selectable input fields selected to override to maintain its result value and update the respective displayed result value associated with said another one of the respective selectable input fields selected to not override to the result value of the first data point.

17. The method according to claim 15, wherein the first data point is displayed in the first display area simultaneously with the first data point and the plurality of other data points being displayed in the second display area of the display.

18. The method according to claim 15, further comprising:

display, in response to a user input selecting a second data point of a first report of the plurality of reports, one or more other data points of one or more other reports of the plurality of reports, wherein the one or more data items are identified based on similarity of a name of the second data point compared to names of the one or more other data points; and transmit, in response to a user input selecting at least one of the displayed one or more other data points, information associating the second data point and the selected at least one of the displayed other data points.

19. The client device according to claim 13, wherein the processing system configured to:

receive user input on one of the respective selectable input fields selecting to override and on another one of the respective selectable input fields selecting not to override; and update the respective displayed result value associated with said one of the respective selectable input fields selected to override to maintain its result value and update the respective displayed result value associated with said another one of the respective selectable input fields selected to not override to the result value of the first data point.

* * * * *

UNITED STATES PATENT AND TRADEMARK OFFICE
CERTIFICATE OF CORRECTION

| | | |
|---|---|---|
| PATENT NO. | : 12,056,140 B2 | Page 1 of 1 |
| APPLICATION NO. | : 17/721954 | |
| DATED | : August 6, 2024 | |
| INVENTOR(S) | : Nicholas Lomanto | |

It is certified that error appears in the above-identified patent and that said Letters Patent is hereby corrected as shown below:

On the Title Page

(30) Foreign Application Priority Data should be added:
October 29, 2021 IN ..... 202111049047

Signed and Sealed this
Twelfth Day of November, 2024

Katherine Kelly Vidal
*Director of the United States Patent and Trademark Office*